(12) United States Patent
Shima et al.

(10) Patent No.: US 9,030,685 B2
(45) Date of Patent: May 12, 2015

(54) PRINTING DEVICE, PRINTING SYSTEM, AND PRINTING METHOD

(71) Applicant: Seiko Epson Corporation, Tokyo (JP)

(72) Inventors: Shoji Shima, Nagano-ken (JP); Katsutoshi Terashima, Nagano-ken (JP); Tadashi Furuhata, Nagano-ken (JP); Yoshihiro Ueno, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/946,211

(22) Filed: Jul. 19, 2013

(65) Prior Publication Data

US 2014/0022580 A1 Jan. 23, 2014

(30) Foreign Application Priority Data

Jul. 20, 2012 (JP) ................................. 2012-162086
Mar. 8, 2013 (JP) ................................. 2013-046461

(51) Int. Cl.
*G06F 3/12* (2006.01)

(52) U.S. Cl.
CPC ............ *G06F 3/1204* (2013.01); *G06F 3/1261* (2013.01); *G06F 3/1285* (2013.01); *G06F 3/1291* (2013.01); *G06F 3/1293* (2013.01); *G06F 3/1297* (2013.01); *G06F 3/1229* (2013.01); *G06F 3/1259* (2013.01)

(58) Field of Classification Search
None
See application file for complete search history.

(56) References Cited

U.S. PATENT DOCUMENTS

| | | | |
|---|---|---|---|
| 6,940,615 B1 | 9/2005 | Shima | |
| 7,970,650 B2 | 6/2011 | Tokorotani | |
| 8,033,452 B2* | 10/2011 | Koakutsu | 235/375 |
| 8,488,166 B2* | 7/2013 | Hirakawa et al. | 358/1.15 |
| 2004/0061896 A1 | 4/2004 | Shimada | |
| 2006/0268335 A1 | 11/2006 | Okada | |
| 2009/0066996 A1 | 3/2009 | Minowa | |
| 2009/0188972 A1* | 7/2009 | Koakutsu | 235/375 |
| 2009/0198582 A1 | 8/2009 | Tokorotani | |
| 2009/0222604 A1 | 9/2009 | Morozumi | |
| 2009/0279133 A1* | 11/2009 | Nakatsuka | 358/1.15 |
| 2009/0303534 A1 | 12/2009 | Gotoh et al. | |
| 2010/0027065 A1* | 2/2010 | Koakutsu | 358/1.15 |
| 2011/0063665 A1* | 3/2011 | Hirakawa et al. | 358/1.15 |
| 2012/0062936 A1 | 3/2012 | Nakajima | |

FOREIGN PATENT DOCUMENTS

| | | |
|---|---|---|
| EP | 2083404 A2 | 7/2009 |
| EP | 2151749 A2 | 2/2010 |
| JP | 2004-213495 A | 7/2004 |
| JP | 2006-007553 A | 1/2006 |
| JP | 2007-174022 A | 7/2007 |
| JP | 2008-176574 A | 7/2008 |
| JP | 2009-187078 A | 8/2009 |
| JP | 2009-207090 A | 9/2009 |
| JP | 2010-052421 | 3/2010 |
| JP | 2012-096503 A | 5/2012 |
| JP | 2012-123597 A | 6/2012 |

* cited by examiner

*Primary Examiner* — Marcus T Riley

(57) ABSTRACT

A POS system 1 includes a POS terminal 10, first printer 60, and second printer 20. The first printer 60 includes a USB interface 64 to which a POS terminal 10 connects, and a first printer print unit 71 that prints, and can output information related to the second printer 20 through the USB interface 64 to the POS terminal 10.

12 Claims, 10 Drawing Sheets

PRINTING DEVICE, PRINTING SYSTEM, AND PRINTING METHOD

CROSS REFERENCE TO RELATED APPLICATIONS

This application claims priority under 35 U.S.C. §119 on Japanese application nos. 2012-162086 and 2013-046461, filed Jul. 20, 2012 and Mar. 8, 2013 respectively. The content of each such application is incorporated herein by reference.

BACKGROUND

1. Technical Field

The present disclosure relates to a printing device, a printing system, and a printing method.

2. Related Art

Systems that print receipts using a printer connected to a control (host) device such as a computer are known from the literature. See, for example, Japanese Unexamined Patent Appl. Pub. JP-A-2009-187078, and JP-A-2012-123597. The system disclosed in JP-A-2012-123597 has a printer that prints receipts and a printer that prints coupons, and prints receipts and coupons using plural printers. Systems enabling replacing a printer with another printer in a system that prints by sending data to a printer from a computer or other host device are also known from the literature. See, for example, JP-A-2012-096503.

However, in order to print using plural printers as described in JP-A-2012-123597 in a system that controls a single printer as described in JP-A-2009-187078, the configuration must be changed by adding another printer, for example. This also requires changing the configuration of the control device to match the changed printing configuration. For example, a device driver program for controlling the added printer must be installed to the control-side computer. Modifying both the hardware and software configuration of the control device and target device has therefore been required in order to change the configuration of a system with a printer by adding a different printer or replacing an existing printer. The control device must also be able to detect the operating status of each printer, and control error detection and determining what printout was not produced when an error occurs.

Because the configuration of the control device must be changed according to the new printer configuration when the printer configuration is changed, there is a need to enable changing the printer configuration more easily.

SUMMARY

A printing device according to an aspect of the disclosure has a print unit that prints, a connection unit that connects to a host device, and a control unit that outputs information related to a different print unit than the print unit to the host device when the host device connects to the connection unit.

The connection unit of the first printing device connects to a different external device than the host device, the printing device also has a print control unit that outputs information related to the print unit, and a detection unit that detects information related to the print unit output by the print control unit, or information output by the external device related to the different print unit than the print unit; and the control unit outputs information to the host device based on the information related to the print unit detected by the detection unit, or information output by the external device related to the different print unit than the print unit.

In a printing device, when the detection unit detects information output by the external device related to the different print unit than the print unit, the control unit outputs to the host device the information output by the external device related to the different print unit than the print unit.

In a printing device, when the detection unit detects information output by the print control unit related to the print unit, the control unit does not output to the host device the information output by the print control unit related to the print unit.

In a printing device, the information related to the print unit is first device information including the type of the print unit, the information related to the different print unit than the print unit is second device information output by the external device including the type of print unit of the external device, the printing device also has a storage unit that stores the first device information and the second device information; and the control unit outputs the second device information to the host device when the host device is connected to the connection unit.

In a printing device, when the host device outputs data to be processed by the external device, the connection unit of the printing device outputs the data to the external device.

The printing system includes, a host device that outputs data, a first printing device having a first print unit that prints, and a second printing device that connects to the first printing device and has a second print unit that prints, the first printing device including a connection unit that connects the host device and the second printing device, and a control unit that outputs information related to the second printing device to the host device connected to the connection unit.

In this printing system, the second printing device prints the data output by the host device with the second print unit, and outputs information related to the second print unit, the first printing device has a print control unit that outputs information related to the first print unit when printing with the first print unit based on data output by the host device, and a detection unit that detects information output by the print control unit related to the first print unit, or information output by the second printing device related to the second print unit, and the control unit controls information output to the host device based on the information output by the print control unit related to the first print unit, or the information output by the second printing device related to the second print unit.

In a printing system, when the detection unit of the first printing device detects information output by the second printing device related to the second print unit, the control unit outputs information output by the second printing device related to the second print unit to the host device.

In a printing system, when the detection unit of the first printing device detects information output by the print control unit related to the first print unit, the control unit outputs the information output by the print control unit related to the first print unit to the host device.

In a printing system, the connection unit of the first printing device sends the data output from the host device to the second printing device.

In a printing system, the information related to the first print unit is first device information including the type of the first print unit, the information related to the second print unit is second device information including the type of the second print unit, and the first printing device also has a storage unit that stores the first device information and the second device information, and outputs the second device information stored in the storage unit to the host device when the host device requests device information from the first printing device.

In a printing system, the host device sends print data for processing by the second printing device to the connection unit of the first printing device; the first printing device receives the print data sent from the host device, and sends the received print data to the second printing device; and the second printing device receives the print data sent from the first printing device, and prints the received print data with the second print unit.

In a printing system, the first printing device has a data analyzing unit that analyzes print data sent from the host device, and a print data storage unit that stores predetermined information and print data related to the predetermined information; and the data analyzing unit determines if the predetermined information is included in the print data, and if the predetermined information is included, the first print unit prints the print data related to the predetermined information.

In a printing system, the host device is a POS terminal that processes transaction information, and the second printing device prints a receipt related to the transaction information sent from the POS terminal.

A print control device is connected to a host device that outputs data, a first printing device that prints the data and outputs first information related to printing, and a second printing device that prints based on data output by the host device and outputs second information related to printing, and has a detection unit that detects the first information output by the first printing device and the second information output by the second printing device, and a control unit that controls information output to the host device based on the first information or second information detected by the detection unit.

A printing method includes, a host device requesting a first printing device for device information including the type of printing device after the host device and the first printing device are connected; the first printing device that was requested for device information sending device information stored for a second printing device to the host device, the host device sending print data to be processed by the second printing device to the first printing device, the first printing device sending the sent print data to the second printing device connected to the first printing device; and the second printing device printing the print data.

DESCRIPTION OF EMBODIMENTS

Embodiment 1

A preferred embodiment is described below with reference to the accompanying figures.

Figure 1:
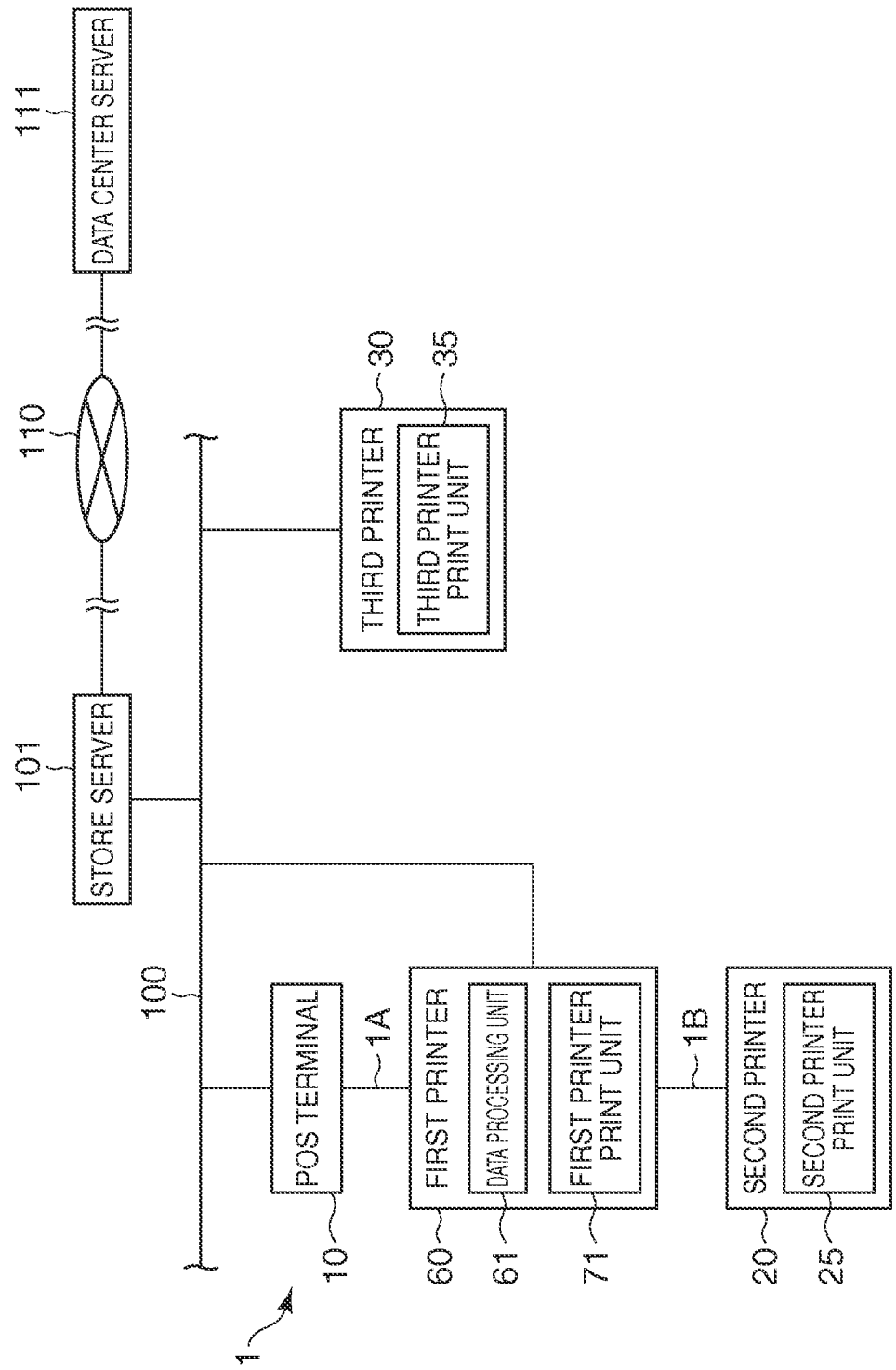
FIG. 1 is a function block diagram of a POS system according to a first embodiment.
Figure 2:
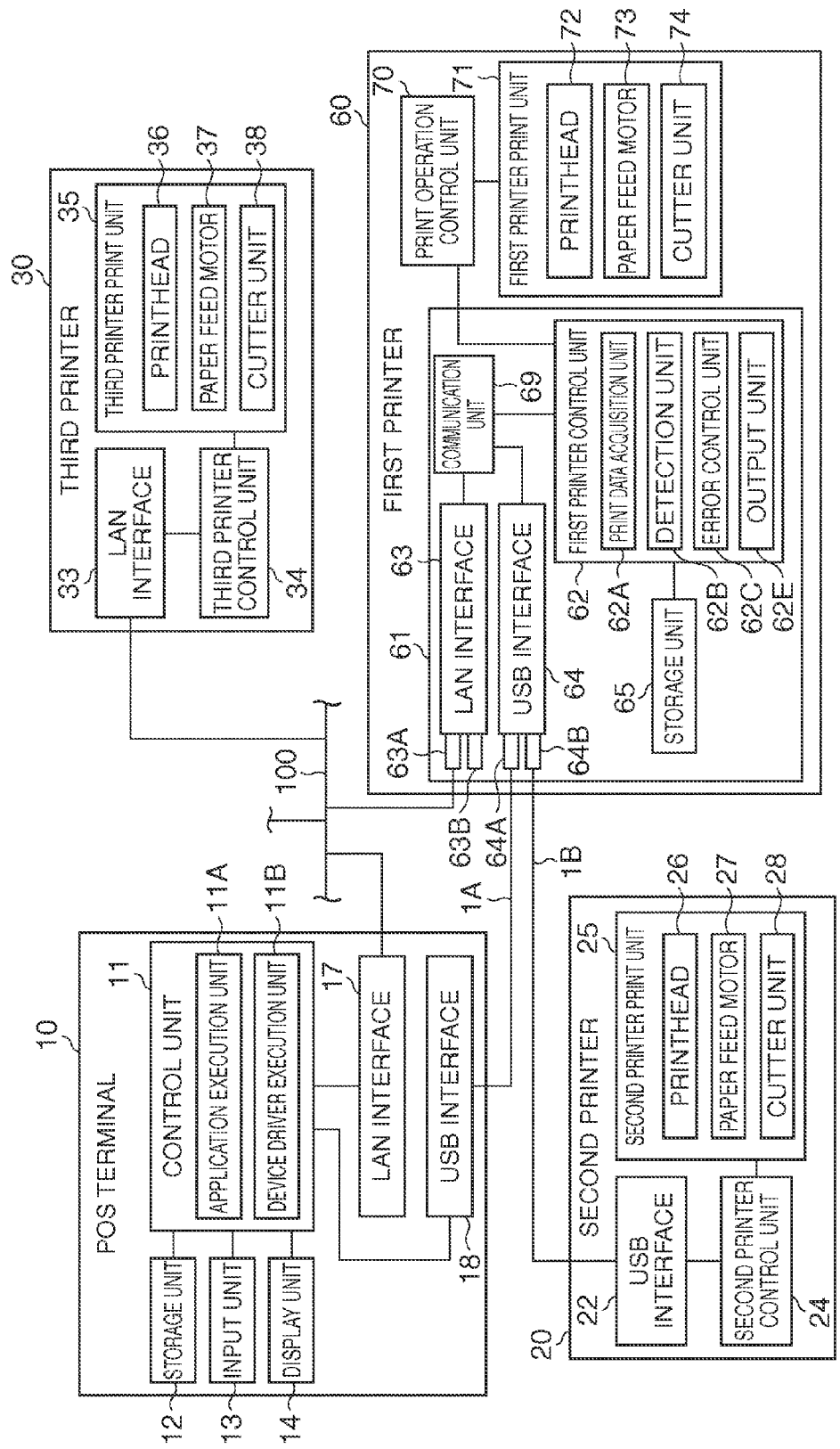
FIG. 2 is a function block diagram of devices in the POS system.

FIG. 1 shows the general configuration of a POS system 1 (printing system) according to the first embodiment, and FIG. 2 is a function block diagram of devices in the POS system 1. The configuration of the POS system 1 is described first below with reference to FIG. 1 and FIG. 2.

The POS (point of sale) system 1 shown in FIG. 1 includes a first printer 60 (printing device, first printing device). The first printer 60 is connected to a POS terminal 10 (host) that executes an application, generates documents, and outputs print instructions. The first printer 60 is also connected to a second printer 20 (second printer, second printing device) that prints according to the print instructions output by the POS terminal 10.

The first printer 60 is connected through USB cable 1A to the POS terminal 10, and the second printer 20 is connected through USB cable 1B to the first printer 60. More specifically, the first printer 60 is installed between the POS terminal 10 and second printer 20. In other words, the first printer 60 and second printer 20 are connected in a daisy chain to the POS terminal 10.

The POS terminal 10 and first printer 60 are both also connected to an in-store LAN 100. A third printer 30 is also connected to the in-store LAN 100, and the POS terminal 10, third printer 30, and first printer 60 can communicate with each other through the in-store LAN 100.

The POS system 1 is used in a shopping center, department store, or other retail business, and is used to manage product marketing, product inventory, and product sales in the business.

The POS terminal 10 is a device that runs a transaction process related to a purchase transaction by a customer and outputs transaction result information at a particular checkout counter in the business. A POS terminal 10 may be installed at each of plural checkout counters.

The POS terminal 10 includes a control unit 11 that centrally controls other parts of the POS terminal 10, and a storage unit 12, input unit 13, and display unit 14 connected to the control unit 11. The POS terminal 10 has a LAN interface 17 or USB interface 18, or both, as interfaces for connecting external devices.

The control unit 11 includes a CPU and memory such as RAM or ROM, and controls other parts of the POS terminal 10 and executes the functions of a POS terminal 10 by running a program stored in the storage unit 12. The control unit 11 has an application execution unit 11A and device driver execution unit 11B. The application execution unit 11A runs a POS application program and executes a transaction process and receipt printing function. The device driver execution unit 11B runs a device driver program and controls a printer connected through the LAN interface 17 or USB interface 18.

The storage unit 12 stores the programs executed by the control unit 11 and data related to those programs.

The input unit 13 connects to an input device such as a keyboard for operating the POS terminal 10, and outputs data input from the input device to the control unit 11.

The display unit 14 has an LCD or other type of display screen, and displays data processed by the control unit 11 and the operating status of the POS terminal 10, for example. The display unit 14 could include a customer display that displays the purchased products and price information for the customer when the POS terminal 10 executes the transaction process.

The LAN interface 17 has an Ethernet (R) connector or IEEE 802.11 wireless communication circuit, connects to the in-store LAN 100, and sends and receives data with other devices over the in-store LAN 100.

The USB interface 18 includes a USB connector and interface circuit conforming to the USB standard, and handles data communication with the second printer 20 and first printer 60. A barcode scanner, magnetic card reader, electronic cash drawer, or other devices can connect to the USB interface 18, but are not shown in the figure.

The application execution unit 11A executes a transaction process related to a product sale based on information input from the input unit 13 or a barcode scanner connected to the USB interface 18, for example. The transaction process includes registering the products purchased by a customer, calculating the total price, registering the amount received, and calculating the amount of change due. Information read from the product barcode, or a product code, is input during the transaction process. Based on the input information, the application execution unit 11A queries the store server 101 based on the input information, and acquires the product name and product price from a product database (not shown in the figure) maintained on the store server 101.

The application execution unit 11A outputs data to be printed and a print instruction to print a receipt for the transaction after the transaction process is completed.

The application execution unit 11A sends the result of the transaction process and/or data compiling the results of transaction processes during a specific period of time through the in-store LAN 100 to the store server 101. The store server 101 acquires the data sent by the POS terminal 10, acquires and compiles data sent by each POS terminal 10 when a plurality of POS terminals 10 are connected to the store server 101, and stores the data in a storage device not shown. The store server 101 could also send the stored data to the data center server 111 at predetermined times.

The device driver program run by the device driver execution unit 11B is compatible with the device connected through the LAN interface 17, or the device connected through the USB interface 18. More specifically, the device driver execution unit 11B in this embodiment is compatible with the second printer 20, and runs a device driver program that causes the second printer 20 to print a receipt. The device driver execution unit 11B acquires the print instruction and data output by the application execution unit 11A, generates a print command and print data for printing the output data according to the received print instruction, and outputs the print command and print data to an external device. The interface to which the target device (the device to control) is connected is set in the device driver execution unit 11B. The device driver execution unit 11B outputs the print command and print data to the LAN interface 17 or USB interface 18, and more specifically to the interface to which the second printer 20 is connected.

In this embodiment the second printer 20 is connected through the first printer 60 to the USB interface 18. The USB interface 18 sends the print command and print data output from the device driver execution unit 11B through the first printer 60 to the second printer 20 using the USB protocol.

The second printer 20 includes a USB interface 22 and a second printer control unit 24 that receives commands through the USB interface 22. The second printer control unit 24 receives print command and print data through the USB interface 22, and executes the received print command and controls the second printer print unit 25 to print. The second printer control unit 24 also sends status information describing the current operating status from the USB interface 22 when printing is successful, when an error occurs, and when a status report request is received from the USB interface 22.

The second printer print unit 25 includes a printhead 26, paper feed motor 27, and cutter unit 28. The printhead 26 forms characters and images on roll paper, cut-sheet paper, or other print medium as controlled by the second printer control unit 24. The paper feed motor 27 conveys the print medium as controlled by the second printer control unit 24. The cutter unit 28 cuts the print medium as controlled by the second printer control unit 24.

The second printer 20 is a thermal printer with a thermal printhead that applies heat to thermal paper as the printhead 26.

The second printer control unit 24 determines if data (text data) that specifies the characters to be printed using character codes is included in the print data received by the USB interface 22. If character code data is found, the second printer control unit 24 reads the font data corresponding to the character codes from a storage unit (second printer storage unit) not shown of the second printer 20, and controls the second printer print unit 25 to print.

The device driver execution unit 11B generates the print data according to the specifications of the second printer 20 as described above. As a result, the device driver execution unit 11B generates and outputs print data containing the character codes of the characters to print to the USB interface 18 when characters are contained in the data output by the application execution unit 11A.

The POS system 1 also has a dedicated third printer 30 for printing coupons. The third printer 30 has a LAN interface 33 that connects to the in-store LAN 100, and a third printer control unit 34 that receives print data sent by the POS terminal 10 through the LAN interface 33. The third printer 30 is a printer that prints coupons based on received print data.

For example, the third printer 30 receives print data sent by the POS terminal 10 to the third printer 30, analyzes the text data (character codes) contained in the received print data, and determines if a predetermined character or string is contained in the text data. If the predetermined character or string is detected, the third printer control unit 34 accesses the store server 101 through the LAN interface 33, and retrieves data for printing a coupon related to the detected character or string.

The third printer control unit 34 prints the coupon print data acquired from the store server 101 with the print unit 35.

The print unit 35 includes a printhead 36, paper feed motor 37, and cutter unit 38. The printhead 36 prints characters and images on roll paper, cut-sheet paper, or other print medium as controlled by the third printer control unit 34. The paper feed motor 37 conveys the print medium as controlled by the third printer control unit 34. The cutter unit 38 cuts the print medium as controlled by the control unit 34.

The first printer 60 includes a first printer print unit 71 (print unit), print operation control unit 70 (print control unit), and data processing unit 61 (first printer data processing unit). The first printer print unit 71 prints on roll paper or cut-sheet paper. The print operation control unit 70 controls the printing operation of the first printer print unit 71.

The data processing unit 61 includes a control unit 62 (printer control unit), a LAN interface 63, a USB interface 64, a storage unit 65 (first printer storage unit), and a communication unit 69 (first printer communication unit). The first printer control unit 62 includes CPU, RAM, ROM, and other peripheral circuits and controls parts of the first printer 60 by running a program stored in the storage unit 65.

The LAN interface 63 has an Ethernet (R) connector or IEEE 802.11 wireless communication circuit, connects to the in-store LAN 100, and sends and receives data with other devices over the in-store LAN 100. The LAN interface 63 also has a plurality of connectors 63A, 63B, and can exchange data with each of the other devices connected to the connectors. In this embodiment, for example, the LAN interface 63 exchanges data with the POS terminal 10, third printer 30, store server 101, and other devices connected through the in-store LAN 100 as controlled by the communication unit 69.

The LAN interface 63 also functions as a network hub with a relay function, and can output data received through either connector 63A, 63B to the other connector.

The USB interface 64 includes a USB connector and interface circuit conforming to the USB standard, and handles data communication with the POS terminal 10. The USB interface 64 has a plurality of USB connectors that can connect a USB cable, and in this embodiment has two connectors 64A, 64B.

In this embodiment, connector 64A is a type-B female connector (receptacle) with the shape and pins specified by the USB standard for a target device connector, and can connect to a standard USB cable. The USB interface 64 has the functions of a USB device controller that operates as a target device as defined in the USB standard. The USB interface 64 reports the USB device class ID and device ID to the device connected through a USB cable to connector 64A, and communicates according to the control data sent from the connected device. The connector 64A may be a mini-USB B-connector or a micro-USB B-connector.

The other connector 64B of the USB interface 64 is a type-A female connector with the shape and pins specified by the USB standard for a host device connector, and can connect to a standard USB cable. The USB interface 64 has the functions of a USB host controller that operates as a host device as defined by the USB standard. When a device classified as a target device by the USB standard is connected to connector 64B, the USB interface 64 operates as a host to the connected device, and can recognize the device and communicate with the device. The connector 64B may be a mini-USB A-connector or a micro-USB A-connector. The number of connectors 64B in the USB interface 64 is not specifically limited.

Note that a target device as used herein is an input/output device that connects to a device operating as a host, outputs data to the host as controlled by the host, or outputs data input from the host.

A host as used herein is a computer or other control device that sends commands controlling the I/O devices to the I/O devices operating as target devices.

The USB interface 64 functions as a connection unit connected to the POS terminal 10 and second printer 20 in this embodiment. When the POS terminal 10 is connected to the first printer 60 through the in-store LAN 100, and the second printer 20 is connected to the first printer 60 through the USB interface 64, the LAN interface 63 and USB interface 64 function as connection units.

The first printer control unit 62 acquires a print command and print data through the LAN interface 63 or USB interface 64, whichever is used as the connection interface. Based on the acquired print data, the first printer control unit 62 outputs data for printing to the print operation control unit 70.

The print operation control unit 70 controls the first printer print unit 71 based on the print data output by the first printer control unit 62, and prints on the roll paper, cut-sheet paper, or other print medium. The print operation control unit 70 and first printer print unit 71 together embody a second printing device.

The first printer print unit 71 includes a printhead 72 that forms characters and images on the print medium, a paper feed motor 73 that conveys the print medium, and a cutter unit 74 that cuts the print medium, and these units operate as controlled by the print control unit 70 (first printer print control unit).

The data processing unit 61 may be an inkjet printer or thermal printer, for example. When the first printer 60 is an inkjet printer, the first printer 60 has an inkjet printhead 72 that ejects four colors of ink, CMYK, onto the printing surface of the print medium to form characters and images. The printhead 72 could be a printhead that uses two colors of ink, red and black, or a printhead that uses the four CMYK colors plus additional colors of ink. When the first printer 60 is a thermal printer, the printhead 72 is a thermal head that applies heat to the printing surface of the print medium.

When configured as an inkjet printer, the first printer 60 is suited to printing graphic data (image data). In this embodiment the first printer control unit 62 generates image data by page unit specifying the position, size, and color of the characters and images printed on the print medium, and outputs this image data to the print control unit 70.

When the first printer 60 is a thermal printer, the first printer 60 is suited to printing text data. In this embodiment the first printer control unit 62 outputs data containing the character codes of the characters to print on the print medium to the print operation control unit 70. The print operation control unit 70 then reads the font data corresponding to the character codes from a storage unit not shown of the print operation control unit 70, and controls the first printer print unit 71 to print.

The first printer control unit 62 has a print data acquisition unit 62A that acquires print data, and a detection unit 62B that detects errors in the second printer 20 and print operation control unit 70. The first printer control unit 62 also has an error control unit 62C that controls sending an error report to the POS terminal 10 when the detection unit 62B detects an error, and an output unit 62E that outputs print commands and print data.

The print data acquisition unit 62A acquires the print commands and print data sent by the POS terminal 10 to the second printer 20. When the POS terminal 10 is connected to the USB interface 64 as shown in FIG. 1 and FIG. 2, the print data acquisition unit 62A receives and acquires the print data input to the USB interface 64 through the communication unit 69.

When the LAN interface 63 is connected to the in-store LAN 100 or other network, the print data acquisition unit 62A can receive by means of the communication unit 69 print data sent by the POS terminal 10 over the network to another printer. In this event, the communication unit 69 controls the LAN interface 63, and can also receive other data than data addressed to the network address assigned to the LAN interface 63. Based on the network address assigned to the received data, the communication unit 69 extracts the print data sent to the target printer from the received data.

The print data acquisition unit 62A temporarily stores the print command and print data sent from the POS terminal 10 to the storage unit 65, and passes the data to the second printer 20.

The print data acquisition unit 62A has a function for acquiring new print data based on the print data received by the communication unit 69. More specifically, the print data acquisition unit 62A can acquire print data for a coupon based on the receipt print data sent by the POS terminal 10 to the second printer 20. For example, the print data acquisition unit 62A interprets the text data (character codes) contained in the print data sent from the POS terminal 10, and detects a predetermined character or string from this text data. When the predetermined character or string is detected, the print data acquisition unit 62A controls the communication unit 69, accesses the store server 101 through the LAN interface 63, and acquires data for printing based on the detected character or string. The print data acquired by the print data acquisition unit 62A here is print data for a coupon.

For example, when an error occurs in the second printer 20, and the second printer 20 generates and outputs an error report, which is a command indicating that an error occurred, through the USB cable 1B, the detection unit 62B receives the error report. By receiving this error report, the detection unit 62B detects an error in the second printer 20.

The detection unit 62B also communicates command data with the print operation control unit 70, and receives an error report output by the print operation control unit 70 when an error occurs in the first printer print unit 71 or the control operation of the print operation control unit 70.

By receiving this error report, the detection unit 62B detects an error in the print operation control unit 70. The format of the error report output by the print operation control unit 70 is not specifically limited. For example, the first printer control unit 62 exchanges a control signal or control data with the print operation control unit 70 to detect the operating status of the print operation control unit 70. The control signals or control data communicated between the first printer control unit 62 and print operation control unit 70 at a specific time interval or specific time are also a type of error report, for example.

When the detection unit 62B detects an error, the error control unit 62C determines whether or not to send the error report to the POS terminal 10. A condition for sending an error report to the POS terminal 10 is preset for the error control unit 62C. In this embodiment, an error report is sent to the POS terminal 10 when an error is detected in the second printer 20, or an error report is sent to the POS terminal 10 when an error is detected in the print operation control unit 70.

The error control unit 62C also determines if the print unit in which the detection unit 62B detected an error is in the second printer 20 or the print operation control unit 70. The error control unit 62C then controls the communication unit 69 based on the result to send the error report from the USB interface 64 to the POS terminal 10. This error report could relay the error report received from the second printer 20 through the USB interface 64, for example. Alternatively, the error report could be a command generated by the error control unit 62C based on a command received from the second printer 20.

The first printer 60 has a mechanical assembly embodying the first printer print unit 71, a main circuit board (print control board) not shown to which the print operation control unit 70 is disposed, and the data processing unit 61 as a discrete circuit board separate from the main circuit board. More specifically, the first printer control unit 62, LAN interface 63, USB interface 64, storage unit 65, and communication unit 69 are mounted on a circuit board separate from the main board, and connect to the print operation control unit 70 through an inter-board interface.

Figure 3:
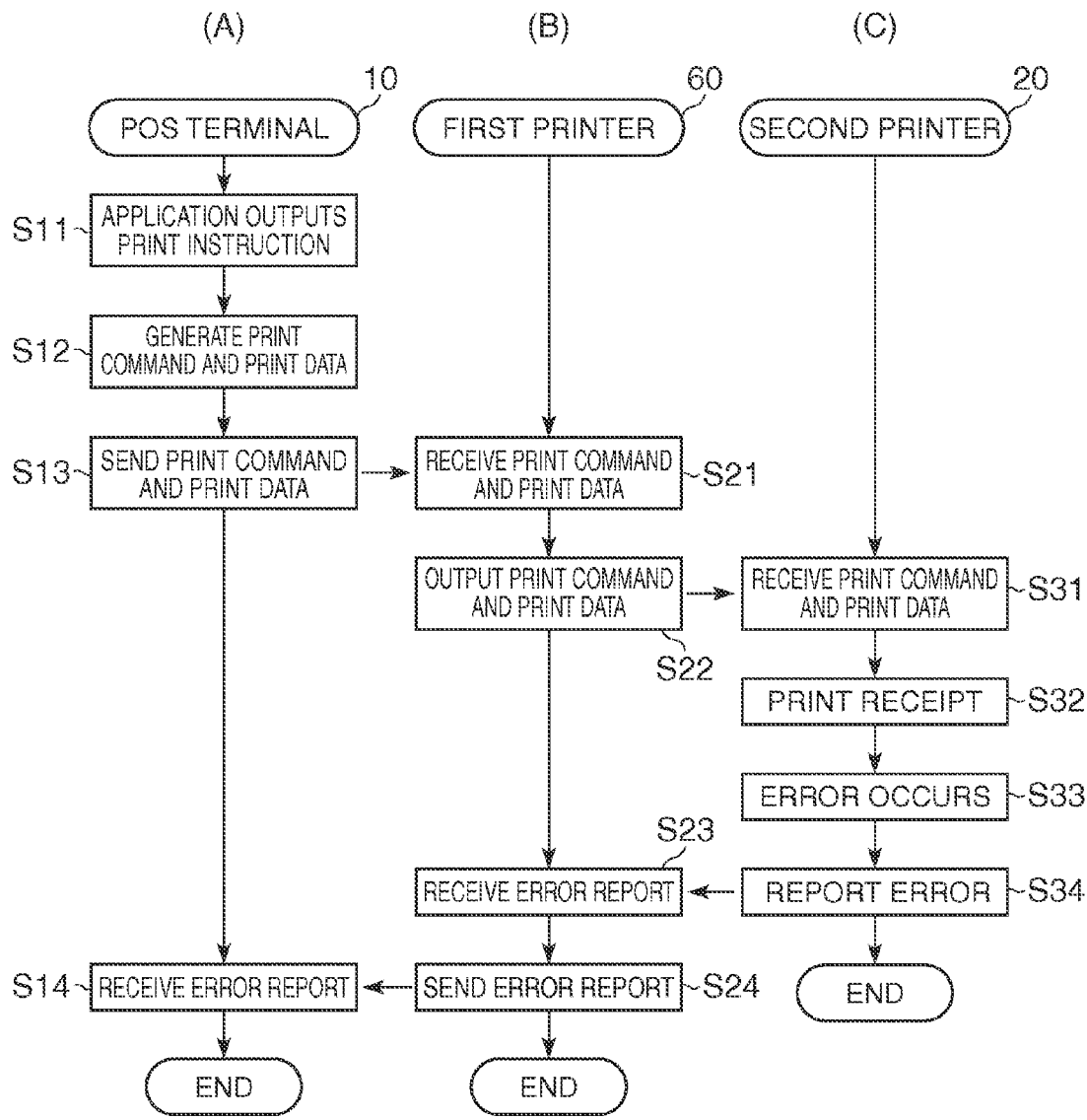
FIG. 3 is a sequence diagram showing an operation of parts of the first embodiment.

FIG. 3 is a sequence diagram showing the operation of parts of the POS system 1, column (A) showing the operation of the POS terminal 10, (B) showing the operation of the first printer 60, and (C) showing the operation of the second printer 20. FIG. 3 describes operation when an error is detected while the second printer 20 prints a receipt.

When the application execution unit 11A executes a transaction process by running a POS application program and outputs a print instruction for a receipt (step S11), the device driver execution unit 11B generates a print command and print data (step S12). This print command and print data is a command and data for the second printer 20. The device driver execution unit 11B outputs the generated print command and print data from the USB interface 18 to the first printer 60 (step S13).

The print data acquisition unit 62A of the first printer 60 then receives the print command and print data sent from the POS terminal 10 through the communication unit 69 and USB interface 64, and temporarily stores the received command and data in the storage unit 65 (step S21). The output unit 62E sends the print command and print data stored in the storage unit 65 from the USB interface 64 to the second printer 20 (step S22).

The second printer control unit 24 of the second printer 20 receives the print command and print data from the first printer 60 through the USB interface 22 (step S31), and prints a receipt (step S32).

When an error occurs in the second printer 20 (step S33), the second printer control unit 24 sends an error report, which is a command indicating that an error occurred, from the USB interface 22 (step S34). Errors occurring in the second printer 20 include, for example, running out of paper, overheating, or a mechanical problem in the print unit 25, and software errors in the second printer control unit 24.

The detection unit 62B of the first printer 60 receives the error report sent by the second printer 20 from the USB interface 64 (step S23), and detects that an error occurred in the second printer 20.

The error control unit 62C determines whether to send an error report to the POS terminal 10, and because the second printer 20 is a printer configured to report errors, sends an error report to the POS terminal 10 through the USB interface 64 (step S24).

The POS terminal 10 then receives the error report through the USB interface 18 (step S14), and reports the error to the operator of the POS terminal 10.

Figure 4:
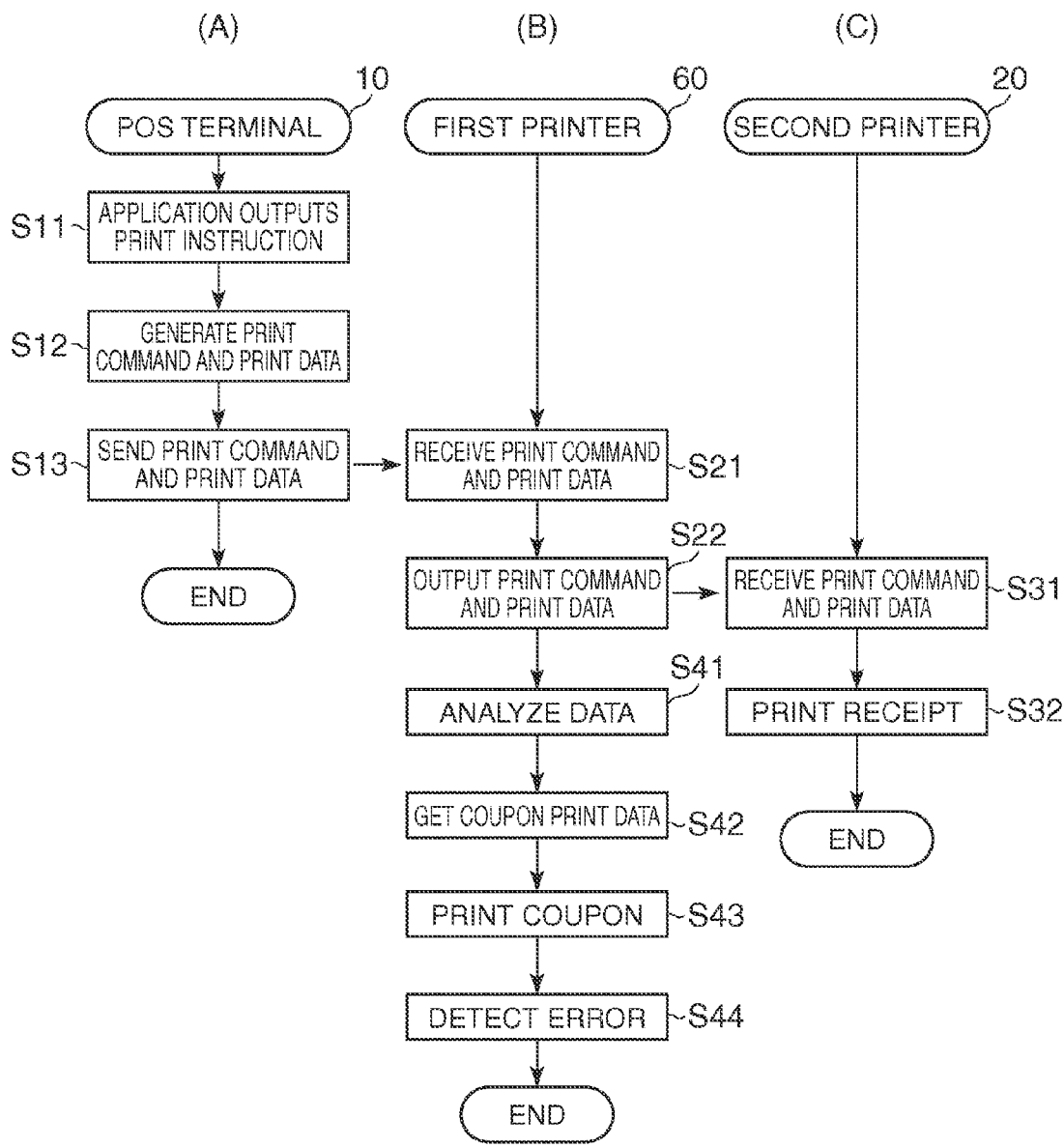
FIG. 4 is a sequence diagram showing another operation of parts of the first embodiment.

FIG. 4 is a sequence diagram showing the operation of parts of the POS system 1, column (A) showing the operation of the POS terminal 10, (B) showing the operation of the first printer 60, and (C) showing the operation of the second printer 20. FIG. 4 describes operation when an error is detected while the print operation control unit 70 prints a coupon.

The application execution unit 11A of the POS terminal 10 first runs a POS application program and outputs a print instruction for a receipt (step S11). The device driver execution unit 11B then generates a print command and print data for the second printer 20 (step S12). The device driver execution unit 11B then outputs the generated print command and print data from the USB interface 18 to the first printer 60 (step S13).

The print data acquisition unit 62A of the first printer 60 then receives the print command and print data sent from the POS terminal 10, and temporarily stores the received command and data in the storage unit 65 (step S21). The output unit 62E then sends the print command and print data stored by the print data acquisition unit 62A in the storage unit 65 to the second printer 20 (step S22).

The second printer control unit 24 of the second printer 20 receives the print command and print data from the first printer 60 through the USB interface 22 (step S31), and prints a receipt (step S32).

The print data acquisition unit 62A of the first printer 60 also analyzes the print data stored in the storage unit 65 (step S41), accesses the store server 101, and gets data for printing a coupon (step S42). The print operation control unit 70 controls the first printer print unit 71, and starts printing the acquired coupon print data (step S43). If an error occurs in the print operation control unit 70 or first printer print unit 71, the print operation control unit 70 outputs an error report to the detection unit 62B, and the detection unit 62B detects the print operation control unit 70 error (step S44). A print operation control unit 70 error includes, for example, running out of paper or ink, or a mechanical problem, in the first printer print unit 71, and software errors in the print operation control unit 70.

The error control unit 62C determines whether or not to send an error report to the POS terminal 10. Because the first printer 60 is not a printer configured to report errors, the process ends without sending an error report to the POS terminal 10.

When the detection unit 62B detects an error in the second printer 20 or the print operation control unit 70, the first printer control unit 62 could substitute a different printer to print in place of the intended printer ("substitute printing" below). Substitute printing as used here is an operation whereby a different printer prints instead of the print unit in which an error occurred, that is, instead of the second printer 20 or print operation control unit 70. For example, when the detection unit 62B detects an error in the second printer 20, the receipt can be printed by the print operation control unit 70. In this event, the output unit 62E outputs to the print operation control unit 70 the print commands and print data sent by the POS terminal 10 to the second printer 20. More specifically, the printout to be produced by the second printer 20 is printed by the first printer print unit 71 instead.

The first printer control unit 62 could also control the third printer 30 to print a receipt intended for printing by the second printer 20. In this event, the first printer control unit 62 sends the print command and print data sent by the POS terminal 10 to the second printer 20 to the third printer 30 by means of the output unit 62E. The third printer 30 receiving this print command and print data then drives the print unit 35 to print the receipt. In this configuration the first printer control unit 62 preferably already knows the network address of the third printer 30 on the in-store LAN 100, for example. A receipt can thus be printed even when an error is detected in both the second printer 20 and the print operation control unit 70.

The first printer control unit 62 can also control substitute printing when the detection unit 62B detects an error in the print operation control unit 70 or first printer print unit 71. In this event, the printout that the print operation control unit 70 should print with the first printer print unit 71 can be printed by the second printer 20 or third printer 30 instead.

When the first printer control unit 62 controls another printer for substitute printing, sending error reports to the POS terminal 10 is optional. For example, a configuration that does not send an error report to the POS terminal 10 when the print operation control unit 70 or third printer 30 substitute prints a receipt before an error report is sent to the POS terminal 10 in step S24 in FIG. 3 (B) is conceivable. Alternatively, an error report could be sent to the POS terminal 10 when the operation of substituting another printer for the second printer 20 to print a receipt fails. Further alternatively, an error report could be sent from the first printer 60 to the POS terminal 10 regardless of whether the operation of substituting another printer for the second printer 20 to print a receipt succeeds or fails. Further alternatively, the first printer 60 could send an error report to the POS terminal 10 after a specific time passes from when the third printer 30 or print operation control unit 70 prints a receipt.

As described above, the first printer 60 in this POS system 1 includes a LAN interface 63 and USB interface 64 as connection units, a first printer print unit 71, a print operation control unit 70, a detection unit 62B, and an error control unit 62C. A POS terminal 10 that outputs data, and a second printer 20 that prints data and outputs error reports, are connected to the LAN interface 63 and USB interface 64. The first printer print unit 71 prints based on data output by the POS terminal 10. The print operation control unit 70 outputs information related to the first printer print unit 71. The detection unit 62B detects error reports output by the second printer 20 and error reports output by the print operation control unit 70. The error control unit 62C controls the information output to the POS terminal 10 based on an error report output by the second printer 20 or an error report output by the first printer print unit 71 detected by the detection unit 62B.

As a result, when the second printer 20 or the print operation control unit 70 outputs an error report, the first printer 60 controls whether or not to output an error report to the POS terminal 10 appropriately to the second printer 20 or print operation control unit 70. Outputting error reports can thus be controlled according to how the first printer 60 and second printer 20 are controlled by the POS terminal 10. Because the control function of the POS terminal 10 therefore does not need to completely match the information output by the first printer 60 and second printer 20, the configuration related to the first printer 60 can be changed without changing the configuration of the POS terminal 10, for example.

When the detection unit 62B detects an error report output by the second printer 20, the error control unit 62C outputs the error report from the second printer 20 to the POS terminal 10. As a result, the POS terminal 10 can control and manage printing by the second printer 20. More specifically, of the first printer print unit 71 and second printer 20 that print based on data output by the POS terminal 10, the POS terminal 10 can precisely control the second printer 20, the printing operation of which is controlled and managed by the POS terminal 10. The POS terminal 10 therefore does not need to control and manage the printing operation for the printing function of the first printer 60. More specifically, there is no need to change the configuration of the POS terminal 10 so that the POS terminal 10 can control and manage the first printer 60 in order to use the first printer 60. The first printer 60 can therefore be connected and used with the POS terminal 10 without changing the configuration of the POS terminal 10, for example.

Embodiment 2

Figure 5:
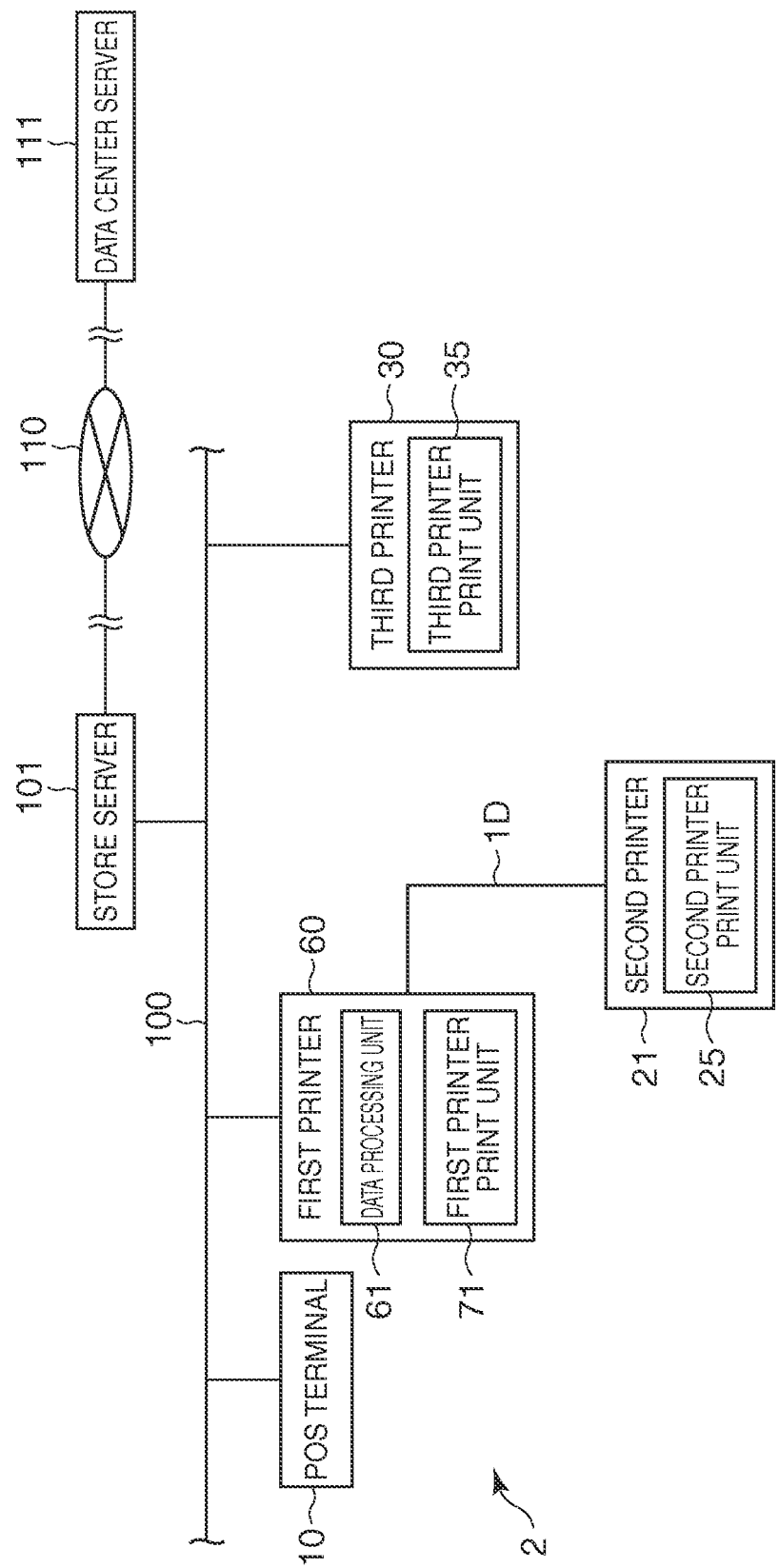
FIG. 5 is a function block diagram of a POS system according to a second embodiment.
Figure 6:
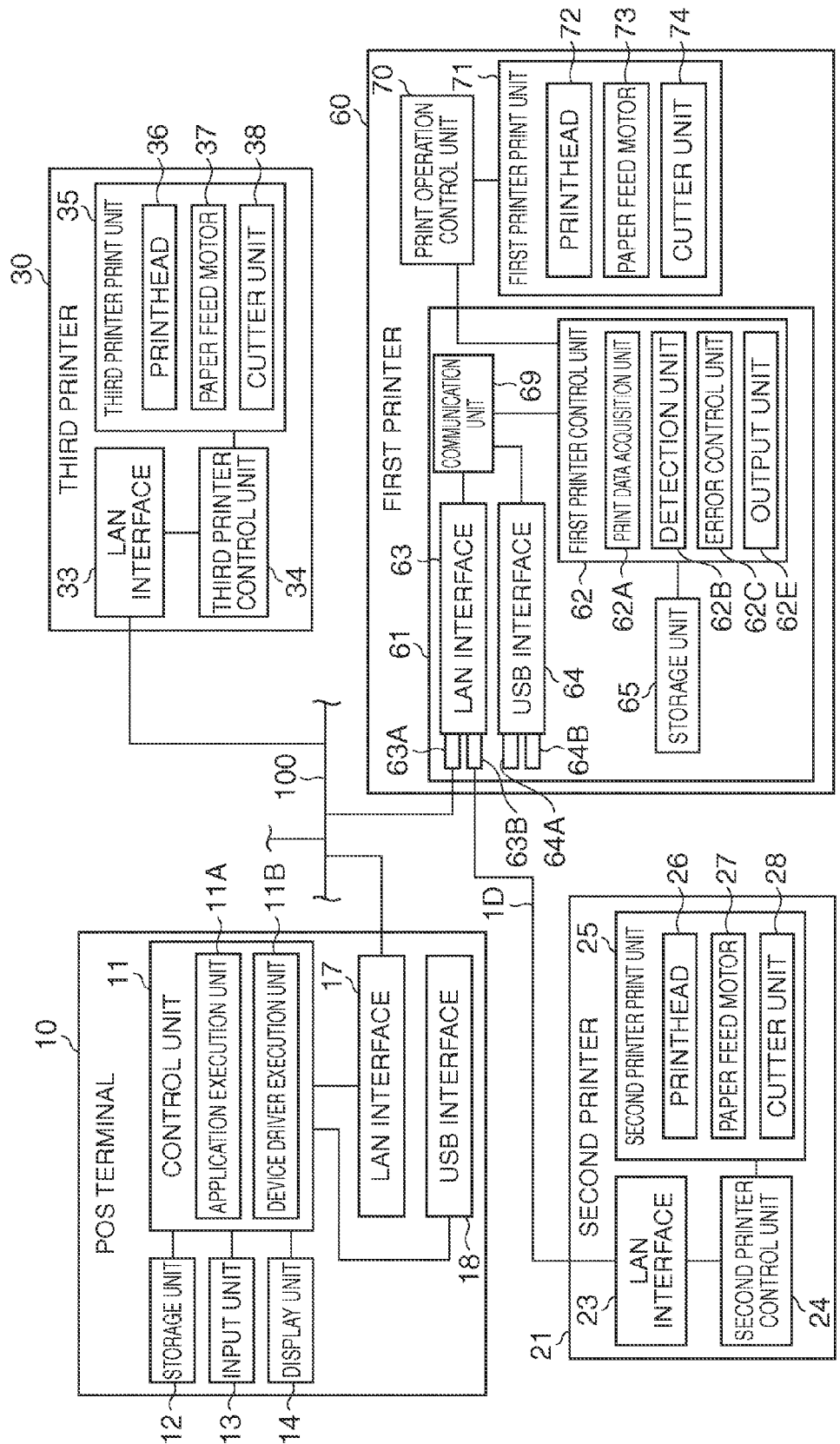
FIG. 6 is a function block diagram of devices in the POS system.

FIG. 5 is a block diagram showing the configuration of a POS system 2 according to a second embodiment, and FIG. 6 is a function block diagram of parts of the POS system 2. Like parts in this and the first embodiment described above are described with like reference numerals, and further description thereof is omitted.

This second embodiment describes a POS system 2 having a second printer 21 (second printing device) that prints receipts connected to the first printer 60 through a LAN cable 1D. In this POS system 2, the POS terminal 10 and first printer 60 are connected to the in-store LAN 100, a third printer 30 is also connected to the in-store LAN 100, and these devices can exchange data with each other over the in-store LAN 100.

The second printer 21 has a second printer control unit 24 and second printer print unit 25 similarly to the second printer 20 according to the first embodiment, but has a LAN interface 23 instead of a USB interface 22. The LAN interface 23 has a standard Ethernet (R) connector, and can exchange data with other devices through a LAN cable. In this second embodiment the second printer 21 is connected through LAN cable 1D to the first printer 60, and is connected to the in-store LAN 100 by a hub function of the LAN interface 63. Other than communicating with the first printer 60 and POS terminal 10 through a LAN cable 1D, the second printer 21 operates identically to the second printer 20 (FIG. 1) described above.

In the first printer 60, the LAN cable of the in-store LAN 100 connects to connector 63A of the LAN interface 63, and LAN cable 1D connects to connector 63B.

The POS terminal 10 sends a print command and print data from the LAN interface 17 through the in-store LAN 100 to the second printer 21. The print command and print data sent by the POS terminal 10 is sent to the second printer 20 through the LAN interface 63. Commands and data sent by the second printer 21 are sent through the LAN interface 63 to the in-store LAN 100, and received by the POS terminal 10, for example.

The first printer control unit 62 controls the LAN interface 63, and receives and stores data sent from the POS terminal 10 to the second printer 21 in the storage unit 65. The first printer control unit 62 receives commands and data sent by the second printer 21 to the POS terminal 10 through the LAN interface 63. These commands and data are sent from the LAN interface 63 to the in-store LAN 100 only when transmission to the POS terminal 10 is required. The first printer control unit 62 therefore controls data communication between the POS terminal 10 and second printer 21 by means of the LAN interface 63.

The POS system 2 according to the second embodiment operates in the same way described in FIG. 3 and FIG. 4. More specifically, when the POS terminal 10 sends a print command and print data instructing printing a receipt to the second printer 21, the first printer 60 receives the print command and print data through the LAN interface 63 by means of the print data acquisition unit 62A. The received print command and print data are then sent from the LAN interface 63 to the second printer 21. Based on the print data received from the POS terminal 10, the print data acquisition unit 62A acquires coupon print data from the store server 101.

When an error occurs while the second printer 21 is printing a receipt, or an error occurs while the first printer 60 is printing a coupon, the detection unit 62B detects the error. The error control unit 62C sends the error report from the LAN interface 63 to the POS terminal POS terminal 10 if the print unit in which an error was detected is configured to report errors, and does not send the error report to the POS terminal 10 if the print unit is not configured to send error reports.

The present disclosure can therefore be used to achieve the same effect as the first embodiment described above when the second printer 21 is connected through a LAN cable 1D to the POS terminal 10 as in the second embodiment.

The present disclosure is not limited to the first and second embodiments described above. For example, the first and second embodiments describe using the first printer 60 in a POS system 1, 2 that uses a POS terminal 10 running a POS application program as the host device. The POS system 1, 2 is described as a system having a second printer 20, 21 and/or a third printer 30 connected to the POS terminal 10. The disclosure is not so limited, however, and can be applied to a configuration having a printer connected to a host device that runs a different data process and prints out other forms.

The foregoing embodiments also describe configurations that send print commands and print data to printers from a POS terminal 10 as the host device. The disclosure is not so limited, however, and a mobile terminal can be used in place of the POS terminal 10, or a client could connect through a communication line to a remotely located server. In this embodiment, the remote server can run an application program, and the client can send print commands and print data generated and transmitted by the server to the printers.

The printers are also not limited to connecting to the POS terminal 10 by wire, and could connect to the POS terminal 10 wirelessly.

The POS terminal 10, second printer 20, 21, and first printer 60 in the first and second embodiments are described as connecting through a USB interface or an in-store LAN 100 through an Ethernet connection, but the disclosure is not so limited. More particularly, the disclosure can be applied to any configuration using any interface enabling data communication between plural devices.

The second printer print unit 25, the third printer print unit 35, and the first printer print unit 71 in the first and second embodiments are described as printing to cut-sheet paper or roll paper. The print units are not limited to a particular printing method, however, and a thermal printer, inkjet printer, dot impact printer, laser printer, or other type of printer may be used. Of the function blocks shown in the FIG. 1, FIG. 2, FIG. 5, and FIG. 6, parts including at least the control units can be achieved through the cooperation of hardware and software, and do not suggest a specific hardware configuration. A configuration that executes the operations including the operations shown in the accompanying sequence diagrams can also be embodied by these parts executing a program stored on an externally connectable non-transitory storage medium.

Embodiment 3

Figure 7:
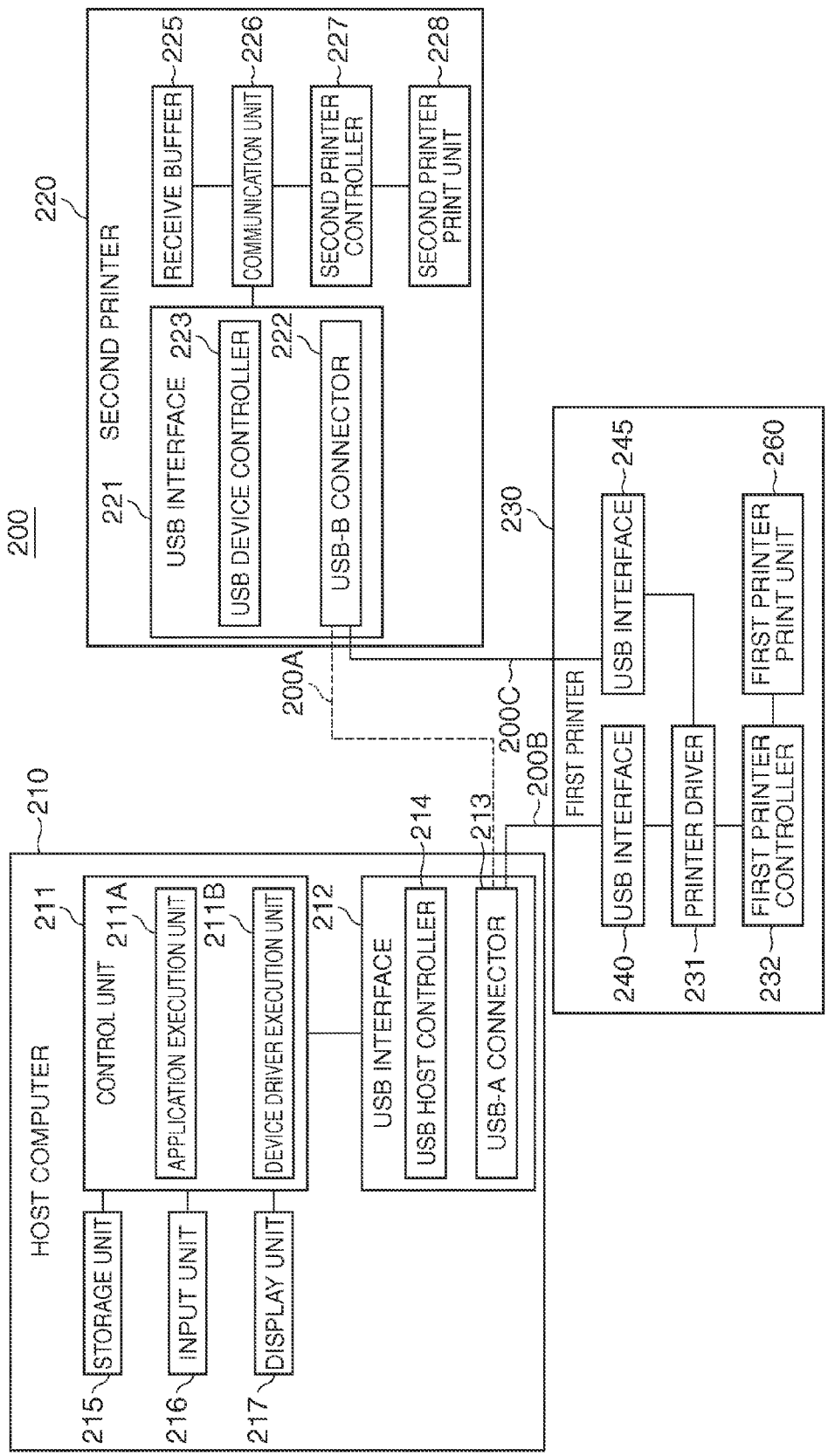
FIG. 7 is a function block diagram of a printing system according to a third embodiment.

FIG. 7 shows the configuration of a printing system 200 according to a third embodiment of the disclosure. The printing system 200 shown in FIG. 7 includes a first printer 230 (printing device, first printing device), a host computer 210 (host), and second printer 220 (second printing device). The first printer 230 is installed between the host computer 210 and second printer 220. The host computer 210 runs an application program, generates documents, and outputs print commands. The second printer 220 prints according to the print commands output by the host computer 210. The host computer 210 and second printer 220 can also be directly connected 1:1 through a USB cable 200A. When connected directly, the second printer 220 directly receives commands and data output by the host computer 210 and prints.

This printing system 200 is constructed based on a system having the host computer 210 directly connected to the second printer 220 through a USB cable 200A. More specifically, the USB cable 200A is disconnected and the first printer 230 is connected to the host computer 210 through USB cable 200B. The first printer 230 and the second printer 220 are then connected to each other through USB cable 200C, creating the printing system 200. The first printer 230 and second printer 220 are thus daisy chained to the host computer 210 in this printing system 200.

The host computer 210 includes a control unit 211, a storage unit 215, an input unit 216, and a display unit 217. The host computer 210 also has a USB interface 212 as an interface to which external devices connect. The USB interface 212 includes a USB-A connector 213, and a USB host controller 214 that handles communication with the device connected through a USB cable to the USB-A connector 213 according to a specific protocol.

The control unit 211 includes a CPU and memory such as RAM or ROM, and centrally controls other parts of the host computer 210 by running a program stored in the storage unit 215.

The application execution unit 211A of the control unit 211 executes an application program stored in the storage unit 215. For example, the control unit 211 runs a POS application program and operates as a POS terminal. The control unit 211 executes a data process related to a product sale based on data input by the input unit 216, and outputs data for printing a receipt showing the result of the product sale process together with an instruction to print.

The control unit 211 also has a device driver execution unit 211B. The device driver execution unit 211B runs a device driver program stored in the storage unit 215, and controls devices connected to the host computer 210. The host computer 210 in this embodiment of the disclosure corresponds to a device that connects through a USB interface 212, and can execute the device driver program with the device driver execution unit 211B.

The device driver execution unit 211B generates print data and print commands causing the printer to print based on the print instructions and data output by the application execution unit 211A, and outputs through the USB interface 212. A device driver that outputs print instructions and data to the second printer 220 is installed to the host computer 210 in this embodiment.

This USB interface 212 and the USB interfaces 221, 240, 245 described below render the physical layer, link layer, and protocol layers defined by the USB standard, and enable serial data communication between devices connected 1:1. The USB standard as used herein includes USB 1.1 to USB 3.0 and future versions and extensions.

The USB-A connector 213 of the USB interface 212 is a female connector (receptacle) with the shape and pins specified by the USB standard for a connector of the device on the host side. Standard USB cables 200A and 200B can connect to the USB-A connector 213. The USB-A connector 213 may be a mini-A or a micro-A USB connector. This also applies to the USB-A connector 246 (FIG. 8) described below. The number of USB-A connectors 213 disposed to the USB interface 212 is not specifically limited.

When a device equivalent to a USB device defined by the USB standard is connected to the USB-A connector 213, the USB host controller 214 operates as the host to this device, and can recognize the device and communicate with the device.

A device as used herein is, for example, an input/output (I/O) device that connects to another device operating as the host, and outputs data to the host as controlled by the host, or outputs data input from the host. The host is, for example, a computer that sends commands for controlling I/O devices to the connected I/O devices.

The second printer 220 is a device that has a second printer print unit 228 (second print unit) that includes a printhead, paper feed motor, conveyance rollers, and cutter unit not shown, and prints (records) text and images on cut-sheet paper, roll paper, or other print medium. The second printer 220 includes a USB interface 221 (communication unit), communication unit 226, and second printer controller 227. The communication unit 226 exchanges data with the device connected through the USB interface 221. The second printer controller 227 controls the second printer print unit 228 and prints based on data received by the communication unit 226.

The USB-B connector 222 of the USB interface 221 is a female connector with the shape and pins specified by the USB standard for a connector on the target device side. Standard USB cables 200A and 200C can connect to the USB-B connector 222. The USB-B connector 222 may be a mini-B or a micro-B USB connector. This also applies to the USB-B connector 241 (FIG. 8) described below. The USB device controller 223 operates as a USB target device as defined by the USB standard. The USB device controller 223 reports its USB device class ID and device ID to the device connected through a USB cable to the USB-B connector 222, and communicates according to the control data sent from the connected device.

The communication unit 226 receives commands and data through the USB interface 221 and temporarily stores the commands and data in the communication buffer 225. The communication unit 226 also transmits control commands and data about the status of the second printer 220 through the USB interface 221.

The second printer controller 227 reads and executes the commands stored in the communication buffer 225 in the order received. For example, when the second printer controller 227 reads a command requesting a status transmission from the communication buffer 225, the second printer controller 227 generates and sends status information describing the operating status of the second printer 220 from the communication unit 226. When a print command accompanying print data is read from the communication buffer 225, the second printer controller 227 controls the second printer print unit 228 and prints according to the command. The second printer controller 227 then generates a completion report indicating that printing ended, or an error report indicating that an error occurred, and transmits the report by means of the communication unit 226 from the USB interface 221.

The first printer 230 has two USB interfaces 240, 245. The host computer 210 connects to the USB interface 240 through USB cable 200B. The second printer 220 connects to the other USB interface 245 through USB cable 200C.

The first printer 230 includes a communication control unit 231 that controls communication through the USB interfaces 240, 245. The first printer 230 also has and prints by means of a first printer print unit 260 (print unit, first print unit) including a printhead, paper feed motor, conveyance rollers, and cutter unit not shown. The first printer 230 also has a first printer controller 232 (print control unit) that controls the first printer print unit 260 and prints based on data communicated by the control unit 231.

Figure 8:
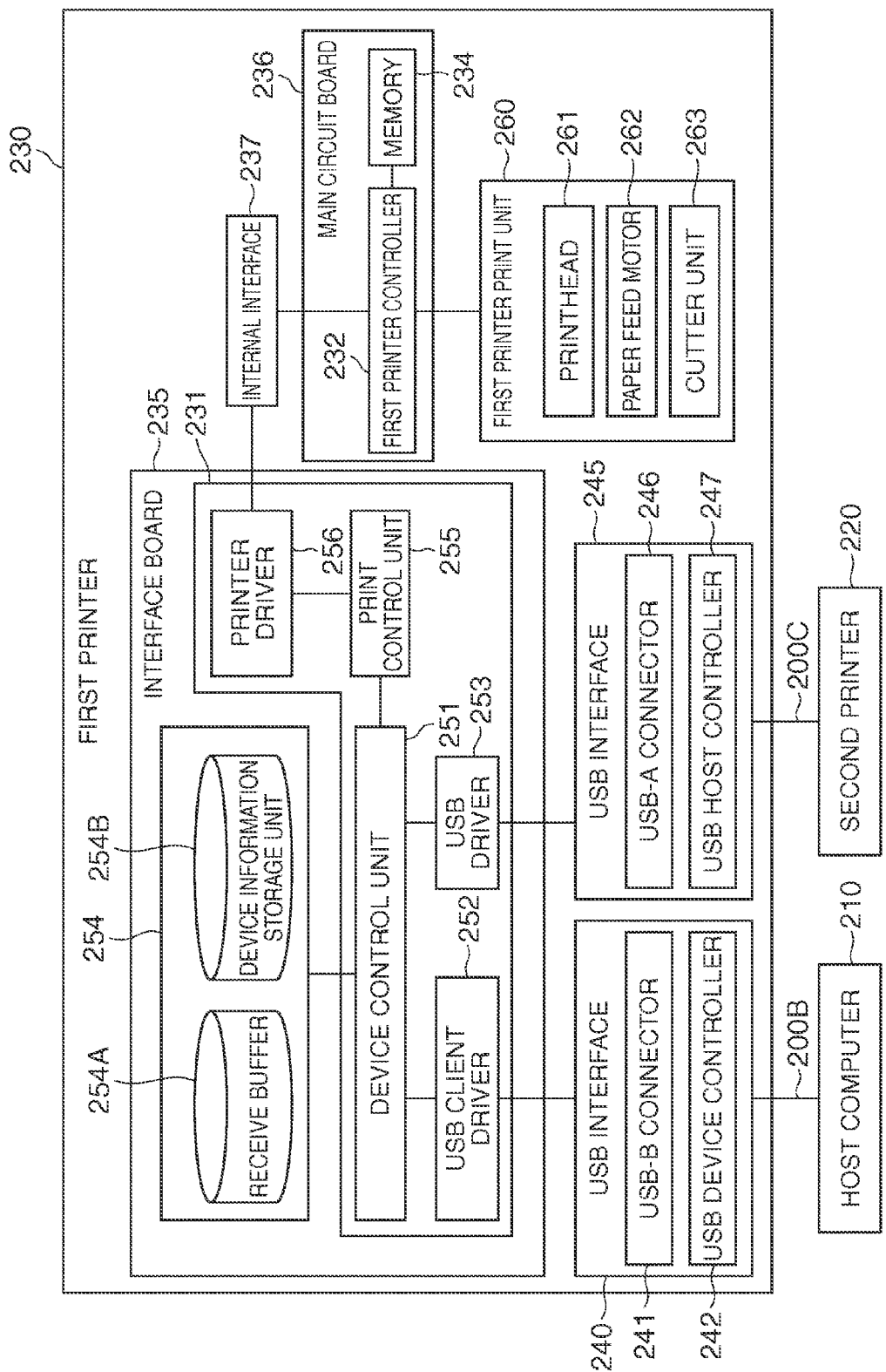
FIG. 8 is a function block diagram of a first printer in the third embodiment.

FIG. 8 is a function block diagram of the printing system 200 showing the configuration of the first printer 230 in detail.

As shown in FIG. 8, USB interface 240 (connection unit) includes a USB-B connector 241 and a USB device controller 242. The USB interface 245 (device connection unit) includes a USB-A connector 246 and a USB host controller 247.

Like USB-B connector 222, the USB-B connector 241 is a female connector with the shape and pins specified by the USB standard for a target device connector, and connects to USB cable 200B.

Like USB-A connector 213, USB-A connector 246 is a female connector with the shape and pins specified by the USB standard for a host connector. USB cable 200C connects to USB-A connector 246. The number of USB-A connectors 246 in the USB interface 245 is not specifically limited.

The USB device controller 242 reports its USB device class ID and device ID to the device connected to the USB-B connector 241, and communicates according to the control data sent from the connected device. When a USB device as defined by the USB standard is connected to the USB-A connector 246, the USB host controller 247 operates as the host device for the connected USB device. The USB host controller 247 can recognize the connected device and communicate with the device.

More specifically, the first printer 230 operates as a USB target device relative to the device connected to USB interface 240 (the host computer 210 in this embodiment), and operates as a host relative to the device connected to USB interface 245 (the second printer 220 in this embodiment).

The control unit 231 includes a device control unit 251, USB client driver 252, USB driver 253, print control unit 255, and printer driver 256. The control unit 231 includes CPU, RAM, ROM, and other peripheral circuits not shown mounted on the interface board 235, and parts of the control unit 231 are achieved as software constructions as a result of the CPU running a control program. The interface board 135 also has a storage unit 254 connected to the control unit 231.

The storage unit 254 includes flash ROM mounted on the interface board 235, for example. A receive buffer 254A (print data storage unit) and device information storage unit 254B (storage unit) are created in the storage space of the storage unit 254. When the control unit 231 receives a print instruction command and data from the host computer 210 as described below, the receive buffer 254A sequentially stores the received commands and data. The device information storage unit 254B stores the USB device information (device information) that the control unit 231 sends to the host computer 210.

The control unit 231 functions as a USB client driver 252 by executing a specific driver program.

The USB client driver 252 operates as a USB device conforming to the USB standard relative to the host computer 210 connected to the USB interface 240. The USB client driver 252 reports device information from the device connected to the USB interface 240. USB device information includes the USB device class ID and device ID. When USB device information including the device class ID and device ID is requested by the device connected to the USB interface 240, the USB client driver 252 responds to the request by sending the USB device information. Reporting the USB device information enables data communication between the devices.

When the host computer 210 is connected to the USB interface 240 in this embodiment, the USB client driver 252 sends the USB device information to the host computer 210. The USB client driver 252 can output USB device information including the vendor ID of the first printer 230 manufacturer, and the device ID corresponding to the model of the first printer 230. The USB client driver 252 can also output USB device information containing the vendor ID of the second printer 20 manufacturer and the device ID corresponding to the model of the second printer 20 when this information is preset.

More specifically, the first printer 230 stores the USB device information (first device information) of the first printer 230, and the USB device information (second device information) of the second printer 20, in the device information storage unit 254B. The device control unit 251 detects when the host computer 210 is connected to the USB interface 240, and outputs the USB device information for the second printer 220 stored in the storage unit 254 to the USB client driver 252 according to the previous set information. The USB client driver 252 reports the USB device information to the host computer 210. As a result, the host computer 210 recognizes that the second printer 220 is connected to the USB-A connector 223 (FIG. 7). In other words, the host computer 210 operates in the same way as when connected to the second printer 220 through USB cable 200A (FIG. 7) even though the host computer 210 is connected to the first printer 230 through USB cable 200B.

The control unit 231 functions as a USB driver 253 by running a specific device driver program. The USB driver 253 uses the USB host controller 247 and operates as a host device as defined by the USB standard for the device connected to the USB interface 245, and can recognize and communicate with the connected device.

In this embodiment the USB driver 253 is a device driver for the second printer 220, and functions to generate and output print commands and print data for the second printer 220. When the second printer 220 is connected to the USB interface 245, the USB driver 253 requests transmission of the USB device information from the second printer 220. The USB driver 253 thus acquires the information sent by the second printer 220 in response to this request. The USB driver 253 then enters a state enabling communication with the second printer 220. In this event, the second printer 220 operates in the same way as when connected directly to the host computer 210 through USB cable 200A (FIG. 7).

When a print command and print data are output from the host computer 210 connected to USB interface 240, the device control unit 251 stores the commands and data in the receive buffer 254A created in the storage unit 254.

The device control unit 251 outputs the commands and data stored in the receive buffer 254A to the print control unit 255, and outputs to the second printer 220 by means of the USB driver 253. As a result, the commands and data sent by the host computer 210 are transmitted to the second printer 220.

The first printer 230 functions as a host device for the second printer 220 by means of the USB interface 245. The second printer 220 operates according to these commands and data in the same way as when commands and data sent directly from the host are received. In other words, the second printer 220 receives the commands and data and prints in the same way as when the host computer 210 is connected to the USB interface 221 through USB cable 200A.

The first printer 230 has a main circuit board 136 (print control board) and an interface board 235. The first printer controller 232 that controls the first printer print unit 260 is mounted on the main circuit board 236.

The interface board 235 can be removably installed to the first printer 230 separately from the main circuit board 236. The control unit 231, memory 233, and USB interfaces 240, 245 are mounted on the interface board 235. The parts packaged on the interface board 235, and the first printer controller 232 disposed to the main circuit board 236, are connected so that they can exchange data with each other through an internal interface 237 in the first printer 230. Power may be supplied through the internal interface 237 to the parts on the interface board 235, or power may be supplied from the interface board 235 to the main circuit board 236 in a configuration having an external power source connected to the interface board 235.

Memory 234 connects to the first printer controller 232. Memory 234 is a storage unit that temporarily stores commands and data.

As shown in FIG. 8, the first printer print unit 260 includes a printhead 261, paper feed motor 262, and cutter unit 263. The first printer print unit 260 prints as controlled by the first printer controller 232. More specifically, the first printer print unit 260 conveys the cut-sheet paper, roll paper, or other print medium with the paper feed motor 262, prints a character or image with the printhead 261, and cuts the printed print medium with the cutter unit 263.

The print control unit 255 (data interpreting unit) determines if the first printer 230 matches the condition for printing based on the commands and data input from the device control unit 251. If the condition is met, the print control unit 255 generates a print command and print data, and outputs to the printer driver 256.

The print control unit 255 detects, for example, if a predetermined specific string is contained in the print data sent from the host computer 210. If the specific string is detected, the print control unit 255 outputs the print command and print data previously stored in the storage unit 254 linked to that string to the first printer controller 232. More specifically, when the host computer 210 operates as a POS terminal and transmits print commands and print data for printing receipts, the print control unit 255 determines if a predetermined specific product name or product classification data is contained in the print data. If the product name or product classification data is contained in the print data, the print control unit 255 outputs a print command and print data for printing a previously stored coupon to the printer driver 256.

The printer driver 256 is a device driver that drives the first printer print unit 260 and main circuit board 236 of the first printer 230, and is embodied by the control unit 231 executing a specific device driver program.

As a result of this operation, when the host computer 210 sends commands and data for printing a receipt, the second printer 220 produces a receipt according to the received commands and data. The first printer 230 also prints a coupon related to the receipt.

The host computer 210 and second printer 220 can also operate in the same way as when they are connected directly to each other through USB cable 200A. The first printer 230 can also be installed without modifying the application program or device driver program that run on the host computer 210, and without changing an operating condition of the second printer 220. The first printer 230 is connected between the host computer 210 and second printer 220, and has a function for relaying data between the host computer 210 and second printer 220.

The second printer 220 can also print receipts the same way as before the configuration of the printing system 200 was changed, while the first printer 230 can also print coupons related to the printed receipt.

Figure 9:
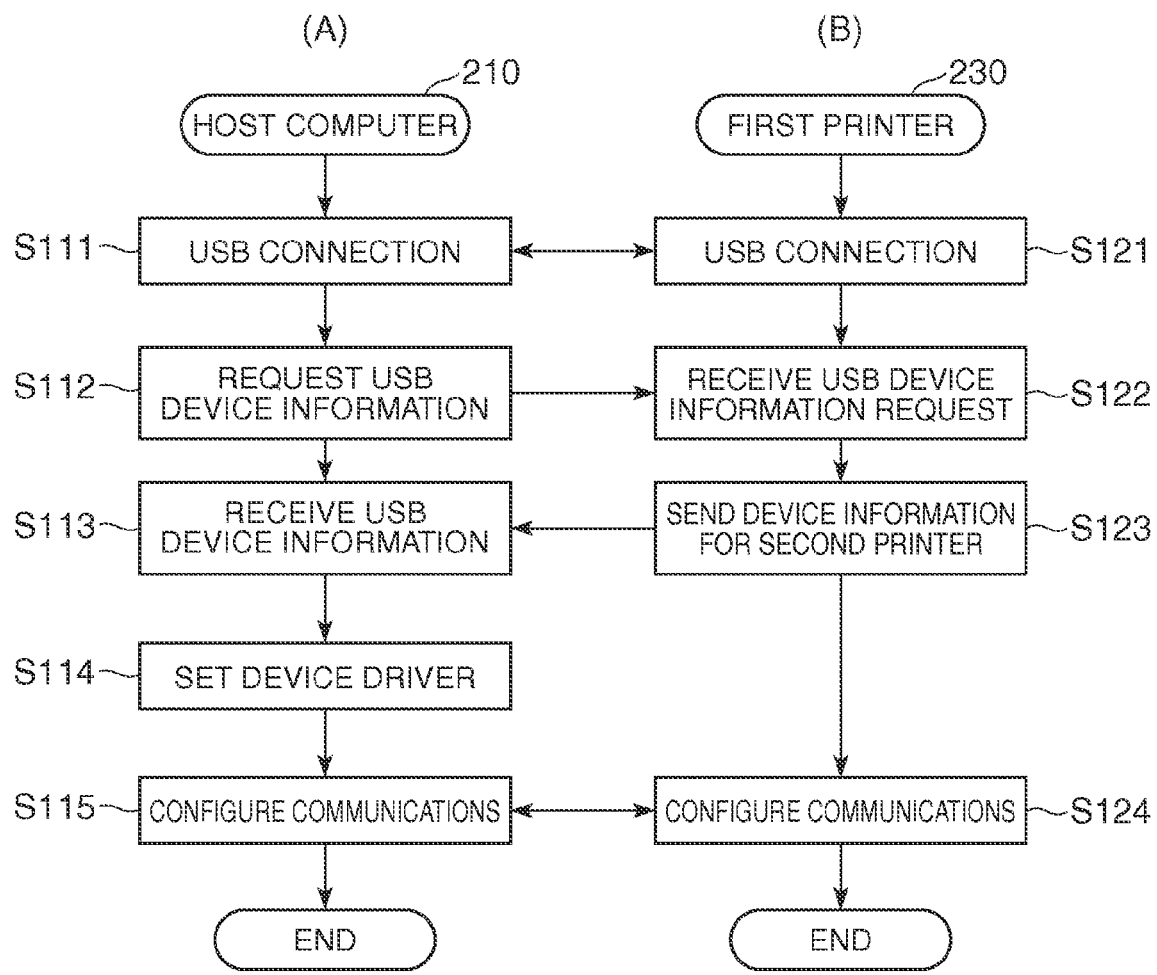
FIG. 9 is a sequence diagram showing an operation of the third embodiment.

FIG. 9 is a sequence diagram showing the operation of parts of the printing system 200, column (A) showing the operation of the host computer 210, and (B) showing the operation of the first printer 230. The operation shown in FIG. 9 is executed when the host computer 210 and first printer 230 are connected through USB cable 200B.

When the host computer 210 detects connection of a device to the USB-A connector 213 (step S111), the host computer 210 operates as a host device to the connected device, and requests the USB device information (step S112).

When the device control unit 251 of the first printer 230 detects connection of a device to the USB interface 240 (step S121), the device control unit 251 operates as a (target) device. The device control unit 251 receives a request for USB device information sent from the host computer 210 (step S122). The device control unit 251 then reads the USB device information for the second printer 220 stored in the device information storage unit 254B, and sends the information to the host computer 210 (step S123).

The host computer 210 receives the USB device information sent from the first printer 230 (step S113). The host computer 210 then uses the device driver execution unit 211B to execute the device driver program corresponding to the received USB device information (step S114).

The host computer 210 and first printer 230 then communicate with each other through USB cable 200B (steps S115, S124) and open a command and data communication link therebetween. After the operation shown in FIG. 9, the host computer 210 recognizes the second printer 220 as the target device connected through USB cable 200B.

Figure 10:
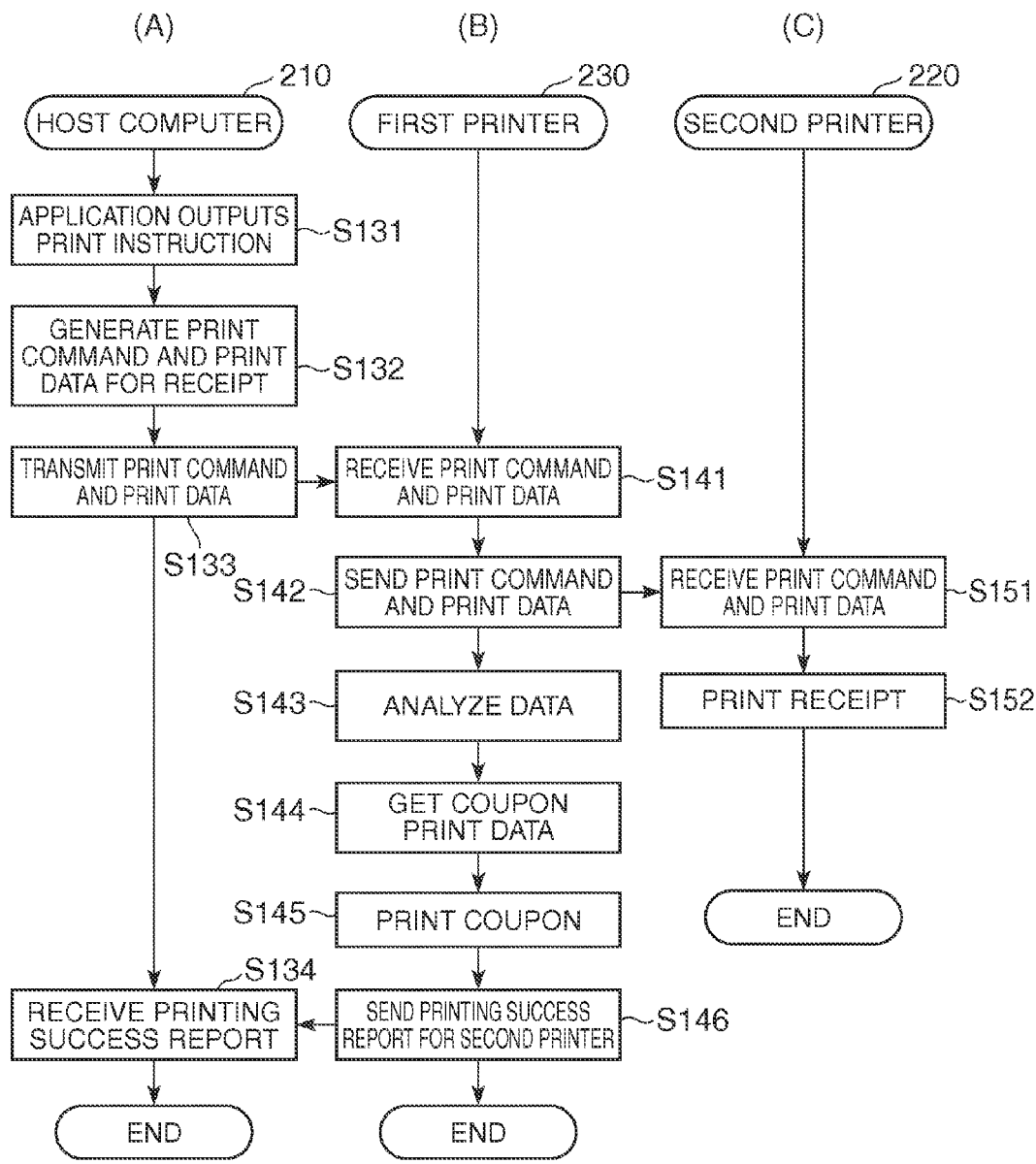
FIG. 10 is a sequence diagram showing an operation of the third embodiment.

FIG. 10 is a sequence diagram showing the operation of parts of the printing system 200, column (A) showing the operation of the host computer 210, (B) showing the operation of the first printer 230, and (C) showing the operation of the second printer 220. The operation shown in FIG. 10 is performed after the operation in FIG. 9.

When a document is created and a print instruction is output by the operation of the application execution unit 211A (step S131), the host computer 210 generates a print command and print data based on the print instruction (step S132). In this instance the device driver execution unit 211B generates the print command and print data to operate the second printer 220. The host computer 210 then outputs the generated print command and print data from the USB interface 212 (step S133).

The print command and print data sent by the host computer 210 is then received by the first printer 230 through the USB interface 240 (step S141). The device control unit 251 stores the print command and print data received by the USB interface 240 to the receive buffer 254A, and outputs the print command and print data from the USB interface 245 (step S142). The device control unit 251 also outputs the commands and data stored in the receive buffer 254A to the print control unit 255.

The print control unit 255 analyzes the print data stored in memory 233 (step S143). The print control unit 255 then acquires data for printing a coupon corresponding to the analyzed print data (step S144), and outputs the acquired data to the printer driver 256. The printer driver 256 outputs the data for printing a coupon through the internal interface 237 to the first printer controller 232, and a coupon is printed as controlled by the first printer controller 232 (step S145).

The print control unit 255 then generates and outputs a printing success report for the second printer 220 to the host computer 210 (step S146).

The host computer 210 receives the printing success report sent from the first printer 230 as the printing success report for the second printer 220 (step S134), and ends this process because printing ended.

The second printer 220 receives the print command and print data sent from the first printer 230 (step S151). The second printer 220 then prints a receipt as controlled by the second printer controller 227 according to the received print command and print data (step S152).

The first printer 230 of the printing system 200 according to this embodiment of the disclosure is thus connected to a host computer 210, and has a first printer print unit 260, device information storage unit 254B, USB interface 240, and device control unit 251. The device information storage unit 254B stores USB device information about the first printer 230, and USB device information about the second printer 220, which is a different printer. The host computer 210 connects to the USB interface 240. When the host computer 210 is connected to the USB interface 240, the device control unit 251 outputs the USB device information of the second printer 220 to the host computer 210. The first printer 230 outputs the USB device information for the second printer 220 to the host computer 210, enabling the host computer 210 to recognize that the second printer 220 was connected to the host computer 210. As a result, the printer connected to the host computer 210 can be changed from the second printer 220 to the first printer 230 without changing the configuration of the host computer 210.

When the host computer 210 outputs print commands and print data for the second printer 220, the device control unit 251 outputs those commands and data from the USB interface 245 to the second printer 220. As a result, the data output by the host computer 210 can be printed by the second printer 220.

The printing system 200 includes a host computer 210 that outputs data, and a first printer 230 having a first printer print unit 260 that prints and a connection unit that connects to the host computer 210. The printing system 200 also includes a second printer 220 having a USB interface 221 that connects and communicates with the first printer 230, and a second printer print unit 228 that prints.

The first printer 230 has a device information storage unit 254B that stores USB device information including the model (type) of the first printer 230, and USB device information including the model (type) of the second printer 220. When the host computer 210 requests the USB device information from the first printer 230, the first printer 230 sends the USB device information for the second printer 220 stored in the device information storage unit 254B to the host computer 210.

Because the first printer 230 outputs the USB device information of the second printer 220 to the host computer 210, the host computer 210 can recognize the first printer 230 as the second printer 220. As a result, the first printer 230 can be connected to a host computer 210 that is compatible with the second printer 220 without changing the configuration of the host computer 210. Therefore, the printer configuration can be changed without changing the configuration of the host computer 210 in a system having a host computer 210 and printer connected together.

A third embodiment of the disclosure is described above, but the disclosure is not limited thereto and can obviously be modified and adapted as desired within the scope of the disclosure.

For example, the third embodiment describes a configuration having a host computer 210 connected to the USB interface 240 of a first printer 230, and a second printer 220 connected to another USB interface 245. The disclosure is not so limited, however, and the device that connects to the USB interface 240 can be any device that can operate as a host device, such as another printer or a mobile terminal device having a USB host controller. The device connected to the USB interface 245 is not specifically limited and can be any device that operates as a USB target device, such as a printer or other input/output device.

The second printer print unit 228 of the second printer 220, and the first printer print unit 260 of the first printer 230 in the foregoing embodiment are described as printing to cut-sheet paper or roll paper. The print unit of the disclosure is not so limited, however, and a thermal printer, inkjet printer, dot impact printer, laser printer, or other type of printer may be used.

The function blocks shown in FIG. 7 and FIG. 8 can also be achieved through the cooperation of hardware and software, and do not suggest a specific hardware configuration. The configuration that executes the operations including the operations shown in the flow charts in FIG. 9 and FIG. 10 can also be embodied by these parts executing a program stored on an externally connectable non-transitory storage medium.

USB interface 240 and USB interface 245 are also not limited to being rendered as discrete hardware constructions. For example, USB-B connector 241 and USB-A connector 246 can be rendered in a single hardware construction having the functions of both USB device controller 242 and USB host controller 247.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

The present disclosure is directed to solving the foregoing problem, and an object is to enable changing the printer configuration without changing the configuration of the control device in a system that controls a printer.

A printing device according to an aspect of the disclosure has a print unit that prints; a connection unit that connects to a host device; and a control unit that outputs information related to a different print unit than the print unit to the host device when the host device connects to the connection unit.

A first printing device with a print unit can output to the host device information related to a second printing device, which is a different printing device (external device). For example, the first printing device can be connected to a host device that is compatible with a second printing device, and the host device can be operated. As a result, the configuration related to the printing device can be changed without changing the configuration of the host device, which is a control device.

Preferably, the connection unit of the first printing device connects to a different external device than the host device; the printing device includes a print control unit that outputs information related to the print unit, and a detection unit that detects information related to the print unit output by the print control unit, or information output by the external device related to the different print unit than the print unit; and the control unit outputs information to the host device based on the information related to the print unit detected by the detection unit, or information output by the external device related to the different print unit than the print unit.

This aspect of the disclosure can detect printing-related information output by the second printing device, and information related to printing by the print unit of the printing device, and control the information output to the host device. As a result, the information output to the host device can be controlled according to how the printing device of the disclosure and the second printing device are controlled by the host device. The configuration of the printing device connected to the host device can therefore be changed without needing to change the control function of the host device according to the configuration of the printing device.

In a printing device according to another aspect of the disclosure, when the detection unit detects information output by the external device related to the different print unit than the print unit, the control unit outputs to the host device the information output by the external device related to the different print unit than the print unit.

When the second printing device outputs information related to printing, this aspect of the disclosure can output this information to the host device. As a result, the host device connected to the printing device can simply control and manage the printing operation of the second printing device, and making the host device compatible with the printing device of the disclosure is not necessary. The printing device of the disclosure can also be used to relay communication between the host device and the second printing device.

In a printing device according to another aspect of the disclosure, when the detection unit detects information output by the print control unit related to the print unit, the control unit does not output to the host device the information output by the print control unit related to the print unit.

When the print control unit detects information related to printing, this information is not output to the host device. Because there is therefore no need to control the printing device on the host device side, the configuration of the host device does not need to be changed so that the host device can control this print unit. The printing device can therefore be connected and used with the host device without changing the configuration of the host device.

In a printing device, the information related to the print unit is first device information including the type of the print unit; the information related to the different print unit than the print unit is second device information output by the external device including the type of print unit of the external device; the printing device includes a storage unit that stores the first device information and the second device information; and the control unit outputs the second device information to the host device when the host device is connected to the connection unit.

The printing device connected to the host device stores device information for the second printing device, which is a different printing device, and outputs the device information for the second printing device to the host device. As a result, the printing device can be recognized as the second printing when connected to the host device. A printing device that is not compatible with the host device can therefore be connected without changing the configuration of the host device.

In a printing device, when the host device outputs data to be processed by the external device, the connection unit of the printing device outputs the data to the external device.

Because the device connection unit outputs to the second printing device data that is output by the host device to the second printing device, the printing device can process data output by the host device and can cause the second printing device to process the data. The connection of the host device and directly connected second printing device can therefore be changed, and the printing device of the disclosure can be installed between the host device and the second printing device, without changing the function or setting of the host device and the second printing device.

Another aspect of the disclosure is a printing system including: a host device that outputs data; a first printing device having a first print unit that prints; and a second printing device that connects to the first printing device and has a second print unit that prints; the first printing device including a connection unit that connects the host device and the second printing device, and a control unit that outputs information related to the second printing device to the host device connected to the connection unit.

Because the first printing device can output information related to the second printing device to the host device, the first printing device can be connected to a host device that is compatible with the second printing device, and the host device can be operated. As a result, the configuration of the printing system can be changed by connecting the first printing device and second printing device, for example, without changing the configuration of the host device, which is the control device.

Preferably in this printing system, the second printing device prints the data output by the host device with the second print unit, and outputs information related to the second print unit; the first printing device has a print control unit that outputs information related to the first print unit when printing with the first print unit based on data output by the host device, and a detection unit that detects information output by the print control unit related to the first print unit, or information output by the second printing device related to the second print unit; and the control unit controls information output to the host device based on the information output by the print control unit related to the first print unit, or the information output by the second printing device related to the second print unit.

The first printing device detects information related to printing by the first printing device and information related to printing by the second printing device, and can control the information output to the host device. As a result, the information output to the host device can be controlled according to how the first and second printing devices are controlled by the host device. Because the control function of the host device does not need to be changed according to the configuration of the printing device, the configuration of the printing device can be changed without changing the configuration of the host device.

In a printing system, when the detection unit of the first printing device detects information output by the second printing device related to the second print unit, the control unit outputs information output by the second printing device related to the second print unit to the host device.

When the second printing device outputs information related to printing, this information is output from the first printing device to the host device. As a result, the host device connected to the first printing device can simply control and manage the printing operation of the second printing device, and making the host device compatible with the first printing device is not necessary. The first printing device can also be used to relay communication between the host device and the second printing device.

In a printing system, when the detection unit of the first printing device detects information output by the print control unit related to the first print unit, the control unit outputs the information output by the print control unit related to the first print unit to the host device.

Because information related to printing by the first printing device is not output to the host device, the host device does not need to control the first printing device. Because there is therefore no need to change the configuration of the host device to control the first printing device, the first printing device can be connected and used with the host device without changing the configuration of the host device.

In a printing system, the connection unit of the first printing device sends the data output from the host device to the second printing device.

The first printing device outputs to the second printing device data that is output by the host device to the second printing device. As a result, data output by the host device can be processed by the first printing device, and the data can be processed by the second printing device. The connection of the directly connected host device and second printing device can therefore be changed, and the first printing device can be installed between the host device and second printing device, without changing the function or setting of the host device and second printing device, for example.

In a printing system, the information related to the first print unit is first device information including the type of the first print unit; the information related to the second print unit is second device information including the type of the second print unit; and the first printing device includes a storage unit that stores the first device information and the second device information, and outputs the second device information stored in the storage unit to the host device when the host device requests device information from the first printing device.

The first printing device connected to the host device stores device information for the second printing device, which is a different printing device, and outputs the device information for the second printing device to the host device. As a result, the host device can be made to recognize the first printing device as the second printing device when the first printing device is connected to the host device. The first printing device can therefore be connected to and used with the host device without changing the configuration of the host device even when the host device is not compatible with the first printing device.

In a printing system, the host device sends print data for processing by the second printing device to the connection unit of the first printing device; the first printing device receives the print data sent from the host device, and sends the received print data to the second printing device; and the second printing device receives the print data sent from the first printing device, and prints the received print data with the second print unit.

Because the first printing device outputs to the second printing device data that is output by the host device to the second printing device, the data output by the host device can be processed by the first printing device and also processed by the second printing device.

In a printing system, the first printing device has a data analyzing unit that analyzes print data sent from the host device, and a print data storage unit that stores predetermined information and print data related to the predetermined information; and the data analyzing unit determines if the predetermined information is included in the print data, and if the predetermined information is included, the first print unit prints the print data related to the predetermined information.

The first printing device can be connected to a host device compatible with the second printing device without changing the configuration of the host device, and the first printing device can interpret the print data sent from the host device and print other information related to the print data.

In a printing system, the host device is a POS terminal that processes transaction information, and the second printing device prints a receipt related to the transaction information sent from the POS terminal.

The first printing device can be connected to a POS terminal without changing the configuration of the POS terminal that prints receipts using the second printing device, and a receipt printing function can be rendered by the second printing device while the first printing device executes another process.

A print control device is connected to a host device that outputs data, a first printing device that prints the data and outputs first information related to printing, and a second printing device that prints based on data output by the host device and outputs second information related to printing; and has a detection unit that detects the first information output by the first printing device and the second information output by the second printing device, and a control unit that controls information output to the host device based on the first information or second information detected by the detection unit.

When first and second printing devices that print based on data output by a host device output information related to printing, the information output to the host device can be controlled according to the first printing device and the second printing device. As a result, output of information to the host device can be controlled according to how the first and second printing devices are controlled by the host device. Because the control function of the host device therefore does not need to completely match the information output by both the first and second printing devices, the configuration related to the printing devices can be changed without changing the configuration of the host device, for example.

Another aspect of the disclosure is a printing method including steps of: a host device requesting a first printing device for device information including the type of printing device after the host device and the first printing device are connected; the first printing device that was requested for device information sending device information stored for a second printing device to the host device; the host device sending print data to be processed by the second printing device to the first printing device; the first printing device sending the sent print data to the second printing device connected to the first printing device; and the second printing device printing the print data.

Because the first printing device connected to the host device outputs device information for the second printing device to the host device, the host device can be made to recognize the first printing device as the second printing device. As a result, the first printing device can be connected to a host device that is compatible with a second printing device without changing the configuration of the host device. The configuration of the printing devices in a system having a host device connected to a printing device can therefore be changed without changing the configuration of the host device.

What is claimed is:

1. A printing device comprising:
a print unit configured to print;
a connection unit configured to connect a host device, a different print unit, and an external device;
a print control unit configured to output information related to the print unit;
a control unit configured to output information related to the different print unit to the host device connected to the connection unit;
a data analyzing unit that analyzes print data sent from the host device; and
a print data storage unit that stores predetermined information and print data related to the predetermined information; wherein
the data analyzing unit determines if the predetermined information is included in the print data, and if the predetermined information is included, the print unit prints the print data related to the predetermined information;
the information related to the print unit is first device information including the type of the print unit;
the information related to the different print unit is second device information including the type of print unit of the external device, output by the external device;
the printing device includes a storage unit that stores the first device information and the second device information; and
the control unit outputs the second device information to the host device when the host device is connected to the connection unit.

2. The printing device described in claim 1, wherein:
the printing device includes
a detection unit configured to detect the information related to the print unit output by the print control unit, or information related to the different print unit output by the external device; and
the control unit is configured to output information to the host device based on the information related to the print unit detected by the detection unit, or information related to the different print unit output by the external device.

3. The printing device described in claim 2, wherein:
when the detection unit is configured to detect information related to the different print unit output by the external device,
the control unit is configured to output to the host device the information related to the different print unit output by the external device.

4. The printing device described in claim 2, wherein:
when the detection unit detects the information related to the print unit output by the print control unit,
the control unit does not output to the host device the information related to the print unit output by the print control unit.

5. The printing device described in claim 1, wherein:
when the host device outputs data to be processed by the external device, the connection unit outputs the data to the external device.

6. A printing system comprising:
a host device configured to output data;
a first printing device including a first print unit configured to print; and
a second printing device that connects to the first printing device and includes a second print unit configured to print;
the first printing device including
 a connection unit that connects the host device and the second printing device,
 a print control unit that outputs information related to the first print unit when printing with the first print unit based on data output by the host device;
 a control unit configured to output information related to the second printing device to the host device connected to the connection unit,
 a data analyzing unit that analyzes print data sent from the host device, and
 a print data storage unit that stores predetermined information and print data related to the predetermined information; wherein
the data analyzing unit determines if the predetermined information is included in the print data, and if the predetermined information is included, the first print unit prints the print data related to the predetermined information;
the information related to the first print unit is first device information including the type of the first, print unit;
the information related to the second print unit is second device information including the type of the second print unit; and
the first printing device also has a storage unit that stores the first device information and the second device information, so that the second device information stored in the storage unit can be output to the host device when the host device requests device information from the first printing device.

7. The printing system described in claim 6, wherein:
the second printing device is configured to print the data output by the host device with the second print unit, and to output information related to the second print unit;
the first printing device includes
 a detection unit that detects the information related to the first print unit output by the print control unit, or the information related to the second print unit output by the second printing device; and
the control unit controls information output to the host device based on the information related to the first print unit, or the information related to the second print unit.

8. The printing system described in claim 7, wherein:
when the detection unit of the first printing device detects the information related to the second print unit output by the second printing device,
 the control unit outputs the information related to the second print unit to the host device.

9. The printing system described in claim 7, wherein:
when the detection unit of the first printing device detects the information related to the first print unit control unit,
 the control unit outputs the information related to the first print unit to the host device.

10. The printing system described in claim 7, wherein:
the connection unit of the first printing device sends the data output from the host device to the second printing device.

11. The printing system described in claim 6, wherein:
the host device sends print data for processing by the second printing device to the connection unit of the first printing device;
the first printing device receives the print data sent from the host device, and sends the received print data to the second printing device; and
the second printing device receives the print data sent from the first printing device, and prints the received print data with the second print unit.

12. A printing method comprising steps of:
a host device requesting from a first printing device device information including the type of printing device after the host device and the first printing device are connected;
the first printing device from which device information was requested sending device information for the first printing device and for a second printing device to the host device;
the host device sending print data to be processed by the second printing device to the first printing device;
the first printing device sending the print data to be processed by the second printing device to the second printing device, the second printing device being connected to the first printing device; and
the second printing device printing the print data; wherein
the first printing device determines if predetermined information is included in the print data when print data is sent from the host device,
the first printing device prints print data related to the predetermined information when the predetermined information is included, and
the first printing device also has a storage unit that stores the first device information and the second device information, and outputs the second device information stored in the storage unit to the host device when the host device requests device information from the first printing device.

* * * * *